(12) United States Patent
Qin et al.

(10) Patent No.: US 11,233,609 B2
(45) Date of Patent: Jan. 25, 2022

(54) METHOD AND APPARATUS FOR SENDING SOUNDING REFERENCE SIGNAL SRS

(71) Applicant: HUAWEI TECHNOLOGIES CO., LTD, Shenzhen (CN)

(72) Inventors: Yi Qin, Kista (SE); Shengyue Dou, Shanghai (CN); Xiang Gao, Beijing (CN); Jianqin Liu, Beijing (CN); Min Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 60 days.

(21) Appl. No.: 16/875,755

(22) Filed: May 15, 2020

(65) Prior Publication Data

US 2020/0280404 A1 Sep. 3, 2020

Related U.S. Application Data

(63) Continuation of application No. PCT/CN2018/115883, filed on Nov. 16, 2018.

(30) Foreign Application Priority Data

Nov. 17, 2017 (CN) .......................... 201711149046.X

(51) Int. Cl.
*H04L 5/00* (2006.01)
*H04L 27/26* (2006.01)

(52) U.S. Cl.
CPC .......... *H04L 5/0012* (2013.01); *H04L 5/0057* (2013.01)

(58) Field of Classification Search
CPC ... H04L 5/0012; H04L 5/0057; H04L 5/0053; H04L 5/0048
See application file for complete search history.

(56) References Cited

U.S. PATENT DOCUMENTS

| 10,952,231 B2 * | 3/2021 | Liou .................. H04W 72/042 |
| 2010/0080187 A1 | 4/2010 | Papasakellariou et al. |

(Continued)

FOREIGN PATENT DOCUMENTS

| CN | 101572896 A | 11/2009 |
| CN | 102714587 A | 10/2012 |

(Continued)

OTHER PUBLICATIONS

"3rd Generation Partnership Project; Technical Specification Group Radio Access Network; Evolved Universal Terrestrial Radio Access (E-UTRA); Physical channels and modulation (Release 13)," 3GPP TS 36.211 V13.7.1, pp. 1-172, 3rd Generation Partnership Project, Valbonne, France (Sep. 2017).

(Continued)

*Primary Examiner* — Asghar H Bilgrami
(74) *Attorney, Agent, or Firm* — Leydig, Voit & Mayer, Ltd.

(57) ABSTRACT

This application provides a method including: receiving first configuration information of a sounding reference signal (SRS) resource from a network device, where the first configuration information includes a repetition factor of the SRS resource, and the repetition factor of the SRS resource is a quantity N of positions at which the SRS resource is mapped to a same subcarrier and mapped to at least one continuous symbol in one time unit, where N≥1 and is an integer; determining at least one first frequency domain resource to which the SRS resource is mapped in a first time unit.

13 Claims, 11 Drawing Sheets

(56) References Cited

U.S. PATENT DOCUMENTS

| | | | |
|---|---|---|---|
| 2011/0013546 A1* | 1/2011 | Hao | H04L 5/0091 370/294 |
| 2011/0058505 A1 | 3/2011 | Pan et al. | |
| 2012/0294254 A1 | 11/2012 | Behravan et al. | |
| 2016/0088614 A1 | 3/2016 | Noh et al. | |
| 2016/0338050 A1* | 11/2016 | Kim | H04W 4/70 |
| 2017/0264409 A1 | 9/2017 | Guo et al. | |

FOREIGN PATENT DOCUMENTS

| | | |
|---|---|---|
| CN | 103051437 A | 4/2013 |
| CN | 106455092 A | 2/2017 |
| CN | 106455094 A | 2/2017 |
| CN | 107040357 A | 8/2017 |
| EP | 2241027 B1 | 5/2019 |
| EP | 3618335 A1 | 3/2020 |
| KR | 20120000482 A | 1/2012 |

OTHER PUBLICATIONS

"3rd Generation Partnership Project; Technical Specification Group Radio Access Network; NR; Physical channels and modulation (Release 15)," 3GPP TS 38.211 V1.0.0, pp. 1-37, 3rd Generation Partnership Project, Valbonne, France (Sep. 2017).

"WF on SRS for NR," 3GPP TSG RAN WG1 Meeting #90b, Prague, Czech Republic, R1-1718968, pp. 1-15, 3rd Generation Partnership Project, Valbonne, France (Oct. 9-13, 2017).

"Remaining details on SRS," 3GPP TSG RAN WG1 Meeting 90bis, Prague, CZ, R1-1718549,, pp. 1-9 3rd Generation Partnership Project, Valbonne, France (Oct. 9-13, 2017).

"Summary of SRS," 3GPP TSG RAN WG1 Meeting AH_NR#3, Nagoya,Japan, R1-1716915, pp. 1-10, 3rd Generation Partnership Project, Valbonne, France (Sep. 18-21, 2017).

* cited by examiner

METHOD AND APPARATUS FOR SENDING SOUNDING REFERENCE SIGNAL SRS

CROSS-REFERENCE TO RELATED APPLICATIONS

This application is a continuation of International Application No. PCT/CN2018/115883, filed on Nov. 16, 2018, which claims priority to Chinese Patent Application No. 201711149046.X, filed on Nov. 17, 2017. The disclosures of the aforementioned applications are hereby incorporated by reference in their entireties.

TECHNICAL FIELD

Embodiments of this application relate to the communications field, and in particular, to a method and an apparatus for sending a sounding reference signal (SRS).

BACKGROUND

In a long term evolution (LTE) system or an LTE-advanced (LTE-A) system, uplink measurement of a terminal device is implemented by sending a sounding reference signal (SRS). A network device obtains uplink channel state information by measuring the SRS sent by the terminal device. Further, in the LTE system or the LTE-A system, because terminal devices have different distances to the network device (for example, a base station), a terminal device with a long distance to the network device may be limited by power. To ensure that the base station receives an SRS with sufficient signal strength, a narrowband needs to be ensured for the terminal device to send an SRS. In this case, measurement of a total system bandwidth can be completed only through SRS frequency hopping.

However, in the LTE system or the LTE-A system, frequency hopping is performed based on a bandwidth configured at a cell level. That is, a frequency hopping manner for the terminal device is determined based on a total SRS measurement bandwidth that is specifically configured for a cell, and only inter-slot frequency hopping is supported. In addition, LTE does not support aperiodic SRS measurement.

It can be learned that, an existing communications system does not well support frequency hopping manners, and has relatively poor flexibility.

SUMMARY

This application provides a method for sending a reference signal, to support a plurality of frequency hopping manners, thereby improving frequency hopping flexibility.

According to a first aspect, this application provides a method for sending a sounding reference signal SRS, and the method includes: receiving, by a terminal device, first configuration information of an SRS resource from a network device, where the first configuration information includes a repetition factor of the SRS resource, and the repetition factor of the SRS resource is a quantity N of positions at which the SRS resource is mapped to a same subcarrier and mapped to at least one continuous symbol in one time unit, where N≥1 and is an integer; determining, by the terminal device based on the first configuration information, at least one first frequency domain resource to which the SRS resource is mapped in a first time unit; and sending, by the terminal device, an SRS to the network device on the at least one first frequency domain resource.

With reference to the first aspect, in some implementations of the first aspect, the determining, by the terminal device based on the first configuration information, at least one first frequency domain resource to which the SRS resource is mapped in a first time unit includes: determining, by the terminal device based on the first configuration information and second configuration information, at least one second frequency domain resource to which the SRS resource is mapped in the first time unit, where the second frequency domain resource is a part of the first frequency domain resource; and the sending, by the terminal device, an SRS to the network device on the at least one first frequency domain resource includes: sending, by the terminal device, the SRS to the network device on the at least one second frequency domain resource.

With reference to the first aspect, in some implementations of the first aspect, the second configuration information is used to indicate an SRS bandwidth parameter and an SRS bandwidth position parameter, the SRS bandwidth parameter is used to determine a bandwidth occupied by the second frequency domain position, and the SRS bandwidth position parameter is used to determine a position of the bandwidth corresponding to the second frequency domain resource in a bandwidth corresponding to the first frequency domain resource.

With reference to the first aspect, in some implementations of the first aspect, the bandwidth corresponding to the second frequency domain resource is a bandwidth in an SRS bandwidth set configured by using a user-level configuration parameter $C_{SRS}$.

With reference to the first aspect, in some implementations of the first aspect, the first configuration information further includes a quantity $N_{symb}^{SRS}$ of symbols that can be occupied by the SRS resource in one time unit, where $N_{symb}^{SRS}$ is a positive integer; the determining, by the terminal device based on the first configuration information, at least one first frequency domain resource to which the SRS resource is mapped in a first time unit includes: determining, by the terminal device based on the first configuration information and third configuration information, at least one third frequency domain resource to which the SRS resource is mapped in the first time unit, where the at least one third frequency domain resource is a subset of a set consisting of the at least one first frequency domain resource in one or more time units; and the sending, by the terminal device, an SRS to the network device on the at least one first frequency domain resource includes: sending, by the terminal device, the SRS to the network device on the at least one third frequency domain position.

With reference to the first aspect, in some implementations of the first aspect, the third configuration information is used to indicate a quantity $t_{symbol}^{SRS}$ of reference symbols, and the quantity of reference symbols is used to determine at least one first frequency domain resource occupied by the SRS resource in the first time unit, where $t_{symbol}^{SRS}$ is greater than $N_{symb}^{SRS}$, and $t_{symbol}^{SRS}$ is a positive integer.

With reference to the first aspect, in some implementations of the first aspect, the third configuration information is used to configure at least one fourth frequency domain resource, a bandwidth of the fourth frequency domain resource is greater than a bandwidth of the first frequency domain resource, and the fourth frequency domain resource includes only one first frequency domain resource.

With reference to the first aspect, in some implementations of the first aspect, the SRS resource is an aperiodic SRS resource, a total bandwidth to be measured consists of K non-overlapping SRS bandwidths, and the sending, by the terminal device, an SRS to the network device on the at least one first frequency domain resource includes: if $N_{symb}^{SRS}$ is less than K·N, sending, by the terminal device, the SRS on each of the at least one first frequency domain resource, and skipping sending the SRS in a time unit other than the first time unit; or if $N_{symb}^{SRS}$ is greater than K·N, sending, by the terminal device, the SRS on first K·N symbols of the SRS resource.

With reference to the first aspect, in some implementations of the first aspect, a frequency separation between a first frequency domain position of the bandwidth occupied by the at least one first frequency domain resource and a first frequency domain position of the total bandwidth to be measured is not greater than a first threshold, and/or a frequency separation between a second frequency domain position of the at least one first frequency domain resource and a second frequency domain position of the total bandwidth to be measured is not greater than a second threshold, where the first threshold is determined based on at least one of the following parameters: K, $N_{symb}^{SRS}$, N, the total bandwidth to be measured, and the user-level SRS bandwidth, and/or the second threshold is determined based on at least one of the following parameters: K, $N_{symb}^{SRS}$, N, the total bandwidth to be measured, and the user-level SRS bandwidth.

Herein, the first frequency domain position of the bandwidth occupied by the at least one first frequency domain resource may be a frequency domain position of a subcarrier having a lowest/highest/central frequency in the bandwidth occupied by the at least one first frequency domain resource, or may be another frequency domain position adjacent to the frequency domain position of the subcarrier corresponding to the lowest, highest, or center frequency. The second frequency domain position of the bandwidth occupied by the at least one first frequency domain resource may be a frequency domain position of a subcarrier corresponding to a highest, lowest, or center frequency in the bandwidth occupied by the at least one first frequency domain resource, or may be another frequency domain position adjacent to the frequency domain position of the subcarrier corresponding to the highest, lowest, or center frequency.

Similarly, the first frequency domain position of the total bandwidth to be measured may be a frequency domain position of a subcarrier corresponding to a lowest, highest, or center frequency in the total bandwidth to be measured, or may be another frequency domain position adjacent to the frequency domain position of the subcarrier corresponding to the lowest, highest, or center frequency. The second frequency domain position of the total bandwidth to be measured may be a frequency domain position of a subcarrier corresponding to a highest, lowest, or center frequency in the total bandwidth to be measured, or may be another frequency domain position adjacent to the frequency domain position of the subcarrier corresponding to the highest, lowest, or center frequency.

With reference to the first aspect, in some implementations of the first aspect, a frequency separation between third frequency domain positions of two adjacent first frequency domain resources in the at least one first frequency domain resource is not greater than a third threshold, and the third threshold is determined based on at least one of the following parameters: K, $N_{symb}^{SRS}$, N, the total bandwidth to be measured, and the user-level SRS bandwidth.

In this embodiment of this application, the third frequency domain position may be any frequency domain position in the bandwidth occupied by the first frequency domain resource, for example, a frequency domain position of a subcarrier corresponding to a lowest frequency, a frequency domain position of a subcarrier corresponding to a highest frequency, a frequency domain position of a subcarrier corresponding to a center frequency, or a frequency domain position of any subcarrier. The frequency domain position of the subcarrier corresponding to the lowest frequency is used as an example. That is, a frequency separation between frequency domain positions of subcarriers corresponding to lowest frequencies on two adjacent first frequency domain resources is not greater than the third threshold.

With reference to the first aspect, in some implementations of the first aspect, a starting symbol of the SRS resource in one time unit, the quantity $N_{symb}^{SRS}$ of symbols occupied by the SRS resource in one time unit, and the repetition factor of the SRS resource are jointly encoded.

With reference to the first aspect, in some implementations of the first aspect, the SRS resource is an aperiodic SRS resource, and the method further includes: if K is not equal to $N_{symb}^{SRS}$, skipping sending, by the terminal device, the SRS on the SRS resource in the first time unit; if K is greater than $N_{symb}^{SRS}$, skipping sending, by the terminal device, the SRS on the SRS resource in the first time unit; or if K is less than $N_{symb}^{SRS}$, skipping sending, by the terminal device, the SRS on the SRS resource in the first time unit.

With reference to the first aspect, in some implementations of the first aspect, values of the repetition factor of the SRS resource include 1, 2, and 4.

With reference to the first aspect, in some implementations of the first aspect, the first time unit is a slot, a subframe, a mini-slot, or a transmission time interval TTI.

According to a second aspect, this application provides a method for receiving a sounding reference signal SRS, and the method includes: sending, by a network device, first configuration information of an SRS resource to a terminal device, where the first configuration information includes a repetition factor of the SRS resource, and the repetition factor of the SRS resource is a quantity N of positions at which the SRS resource is mapped to a same subcarrier and mapped to at least one continuous symbol in one time unit, where N≥1 and is an integer; and receiving, by the network device, an SRS that is sent by the terminal device on at least one first frequency domain resource, where the at least one first frequency domain resource is a frequency domain resource that is determined by the terminal device based on the first configuration information and that is used for sending the SRS.

With reference to the second aspect, in some implementations of the second aspect, the method further includes: sending, by the network device, second configuration information to the terminal device, so that the terminal device determines at least one second frequency domain resource based on the first configuration information and the second configuration information, where the second frequency domain resource is a part of a bandwidth of the first frequency domain resource; and the receiving, by the network device, an SRS that is sent by the terminal device on at least one first frequency domain resource includes: receiving, by the network device, the SRS that is sent by the terminal device on the at least one second frequency domain resource.

With reference to the second aspect, in some implementations of the second aspect, the second configuration information is used to indicate an SRS bandwidth parameter and an SRS bandwidth position parameter, the SRS bandwidth parameter is used to determine a bandwidth occupied by the second frequency domain resource, and the SRS bandwidth position parameter is used to determine a position of the bandwidth corresponding to the second frequency domain resource in a bandwidth corresponding to the first frequency domain resource.

With reference to the second aspect, in some implementations of the second aspect, the bandwidth corresponding to the second frequency domain resource is a bandwidth in an SRS bandwidth set configured by using a user-level configuration parameter $C_{SRS}$.

With reference to the second aspect, in some implementations of the second aspect, the first configuration information further includes a quantity $N_{symb}^{SRS}$ of symbols that can be occupied by the SRS resource in one time unit, where $N_{symb}^{SRS}$ is a positive integer; the method further includes: sending, by the network device, third configuration information to the terminal device, so that the terminal device determines at least one third frequency domain resource based on the first configuration information and the third configuration information, where the at least one third frequency domain resource is a subset of a set consisting of the at least one first frequency domain resource in one or more time units; and the receiving, by the network device, an SRS that is sent by the terminal device on at least one first frequency domain resource includes: receiving, by the network device, the SRS that is sent by the terminal device on the at least one third frequency domain resource.

With reference to the second aspect, in some implementations of the second aspect, the third configuration information is used to indicate a quantity $t_{symbol}^{SRS}$ of reference symbols, and the quantity of reference symbols is used to determine at least one first frequency domain resource occupied by the SRS resource in the first time unit, where $t_{symbol}^{SRS}$ is greater than $N_{symb}^{SRS}$, and $t_{symbol}^{SRS}$ is a positive integer.

With reference to the second aspect, in some implementations of the second aspect, the third configuration information is used to configure at least one fourth frequency domain resource, a bandwidth of the fourth frequency domain resource is greater than a bandwidth of the first frequency domain resource, and the fourth frequency domain resource includes only one first frequency domain resource.

With reference to the second aspect, in some implementations of the second aspect, the SRS resource is an aperiodic SRS resource, a total bandwidth to be measured corresponds to K non-overlapping frequency resources, and bandwidths of the frequency resources are SRS bandwidths, and the receiving, by the network device, an SRS that is sent by the terminal device on at least one first frequency domain resource includes: if $N_{symb}^{SRS}$ is less than K·N, sending, by the terminal device, the SRS on each of the at least one first frequency domain resource, and skipping sending the SRS in a time unit other than the first time unit; or if $N_{symb}^{SRS}$ is greater than K·N, sending, by the terminal device, the SRS on first K·N symbols of the SRS resource.

With reference to the second aspect, in some implementations of the second aspect, a frequency separation between a lowest first frequency domain resource in the at least one first frequency domain resource and a lowest frequency of the total bandwidth to be measured is not greater than a first threshold, and/or a frequency separation between a highest frequency domain position in the at least one first frequency domain resource and a highest frequency of the total bandwidth to be measured is not greater than a second threshold, where the first threshold and the second threshold are determined based on at least one of the following parameters: K, $N_{symb}^{SRS}$, N, the total bandwidth to be measured, and a user-level SRS bandwidth.

With reference to the second aspect, in some implementations of the second aspect, a frequency separation between two adjacent first frequency domain resources in the at least one first frequency domain resource is not greater than a third threshold, and the third threshold is determined based on at least one of the following parameters: K, $N_{symb}^{SRS}$, N, the total bandwidth to be measured, and the user-level SRS bandwidth.

With reference to the second aspect, in some implementations of the second aspect, a starting symbol of the SRS resource in one time unit, the quantity $N_{symb}^{SRS}$ of symbols occupied by the SRS resource in one time unit, and the repetition factor of the SRS resource are jointly encoded.

With reference to the second aspect, in some implementations of the second aspect, the SRS resource is an aperiodic SRS resource, and the method further includes: if K is not equal to $N_{symb}^{SRS}$, failing to receive, by the network device, the SRS in the first time unit; if K is greater than $N_{symb}^{SRS}$, failing to receive, by the network device, the SRS in the first time unit; or if K is less than $N_{symb}^{SRS}$, failing to receive, by the network device, the SRS in the first time unit.

With reference to the second aspect, in some implementations of the second aspect, values of the repetition factor of the SRS resource include 1, 2, and 4.

With reference to the second aspect, in some implementations of the second aspect, the first time unit is a slot, a subframe, a mini-slot, or a transmission time interval TTI.

According to a third aspect, this application provides a terminal device, and the terminal device has functions for implementing the terminal device in the method designs according to the first aspect. The functions may be implemented by hardware, or may be implemented by hardware executing corresponding software. The hardware or the software includes one or more units corresponding to the foregoing functions.

According to a fourth aspect, this application provides a network device, and the network device has functions for implementing the network device in the method designs according to the second aspect. The functions may be implemented by hardware, or may be implemented by hardware executing corresponding software. The hardware or the software includes one or more units corresponding to the foregoing functions.

According to a fifth aspect, this application provides a terminal device, and the terminal device includes a transceiver, a processor, and a memory. The processor is configured to control the transceiver to receive and send a signal, the memory is configured to store a computer program, and the processor is configured to invoke the computer program from the memory and run the computer program, so that the terminal device performs the method in the first aspect.

According to a sixth aspect, this application provides a network device, and the network device includes a transceiver, a processor, and a memory. The processor is configured to control the transceiver to receive and send a signal, the memory is configured to store a computer program, and the processor is configured to invoke the computer program from the memory and run the computer program, so that the network device performs the method in the second aspect.

According to a seventh aspect, this application provides a communications apparatus, and the communications apparatus may be the terminal device in the foregoing method designs, or a chip disposed in the terminal device. The communications apparatus includes: a memory configured to store computer-executable program code, a communications interface, and a processor, where the processor is coupled to the memory and the communications interface.

The program code stored in the memory includes an instruction, and when the processor executes the instruction, the communications apparatus is enabled to perform the method performed by the terminal device in any possible design of the first aspect or the second aspect.

According to an eighth aspect, this application provides a communications apparatus, and the communications apparatus may be the network device in the foregoing method designs, or a chip disposed in the network device. The communications apparatus includes: a memory, configured to store computer-executable program code, a communications interface, and a processor, where the processor is coupled to the memory and the communications interface. The program code stored in the memory includes an instruction, and when the processor executes the instruction, the communications apparatus is enabled to perform the method performed by the network device in any possible design of the first aspect or the second aspect.

According to a ninth aspect, this application provides a computer program product. The computer program product includes: computer program code. When the computer program code is run on a computer, the computer is enabled to perform the method in each of the foregoing aspects.

According to a tenth aspect, a computer-readable medium is provided. The computer-readable medium stores program code. When the computer program code is run on a computer, the computer is enabled to perform the method in each of the foregoing aspects.

According to an eleventh aspect, this application provides a chip system. The chip system includes a processor, configured for a terminal device to implement a function in the foregoing aspects, for example, receiving or processing data and/or information in the foregoing methods. In a possible design, the chip system further includes a memory. The memory is configured to store a program instruction and data necessary to the terminal device. The chip system may include a chip, or may include a chip and another discrete device.

According to a twelfth aspect, this application provides a chip system. The chip system includes a processor, configured to support a network device in implementing a function in the foregoing aspects, for example, sending or processing data and/or information in the foregoing methods. In a possible design, the chip system further includes a memory. The memory is configured to store a program instruction and data necessary to the network device. The chip system may include a chip, or may include a chip and another discrete device.

In the embodiments of this application, the network device can support a plurality of frequency hopping manners by configuring the repetition factor of the SRS resource. For example, the network device can support inter-slot frequency hopping, inter-slot frequency hopping and frequency hopping on each symbol in a slot, inter-slot frequency hopping and frequency hopping on every two symbols in a slot, and frequency hopping of a periodic or semi-persistent SRS resource and frequency hopping of an aperiodic SRS. This can improve frequency hopping flexibility.

DESCRIPTION OF EMBODIMENTS

The following describes technical solutions of this application with reference to accompanying drawings.

Figure 1:
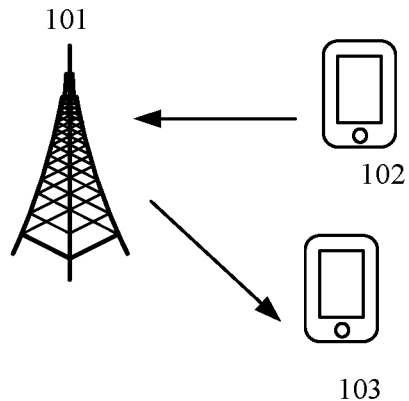
FIG. 1 shows a wireless communications system 100 to which embodiments of this application are applicable.

FIG. 1 shows a wireless communications system 100 to which embodiments of this application are applicable. The communications system 100 may include at least one network device 101. The network device 101 communicates with one or more terminal devices (for example, a terminal device 102 and a terminal device 103 shown in FIG. 1). The network device 101 may be a base station, a device obtained after a base station is integrated with a base station controller, or another device having a similar communication function.

The wireless communications system described in the embodiments of this application may include but is not limited to: a global system for mobile communications (GSM) system, a code division multiple access (CDMA) system, a wideband code division multiple access (WCDMA) system, a general packet radio service (GPRS), a long term evolution (LTE) system, a long term evolution advanced (LTE-A) system, an LTE frequency division duplex (FDD) system, LTE time division duplex (TDD), a universal mobile telecommunications system (UMTS), a worldwide interoperability for microwave access (WiMAX) communications system, a next-generation communications system (for example, fifth-generation (5G) communications system), a system converged by a plurality of access systems, an evolved system, three application scenarios of a next-generation 5G mobile communications system: eMBB, URLLC, and eMTC, or a future emerged new communications system.

The network device 101 in the embodiments of this application may be any device having a wireless receiving and sending function or a chip that can be disposed in the device. The device includes but is not limited to: a base station (for example, a NodeB or an evolved NodeB (eNodeB)), a network device in a fifth-generation (5G) communications system (for example, a transmission point (TP), a transmission reception point (TRP), a base station, or a small cell device), a network device in a future communications system, and an access node, a wireless relay node, a wireless backhaul node, and the like in a wireless fidelity (Wi-Fi) system.

The terminal device (for example, the terminal device 102 in FIG. 1) in the embodiments of this application may include various access terminals having a wireless communication function, a subscriber unit, a subscriber station, a mobile station, a mobile console, a remote station, a remote terminal, a mobile device, a user terminal, a terminal, a wireless communications device, a user agent, or a user apparatus. For example, the terminal device may be a mobile phone, a tablet computer (Pad), a computer having a wireless sending and receiving function, a virtual reality (VR) terminal device, an augmented reality (AR) terminal device, a wireless terminal in industrial control, a machine type communication (MTC) terminal, customer premise equipment (CPE), a wireless terminal in self driving, a wireless terminal in remote medicine, a wireless terminal in a smart grid, a wireless terminal in transportation safety, a wireless terminal in a smart city, a wireless terminal in a smart home, and the like. An application scenario is not limited in the embodiments of this application. In this application, the foregoing terminal device and the chip that can be disposed in the foregoing terminal device are collectively referred to as a terminal device.

For ease of understanding the solutions, some concepts in the embodiments of this application are briefly described first.

An SRS resource is a resource that is configured by the network device for the terminal device and that is used for sending a sounding reference signal (SRS). In the embodiments of this application, the terminal device sends an SRS to the network device on a per time unit basis. The SRS resource configured by the network device for the terminal device includes configurations of a frequency domain resource, a time domain resource, a code domain resource, and the like. The embodiments of this application are mainly about the configurations of the time domain resource and the frequency domain resource. Optionally, the SRS resource may be understood as an SRS resource configuration.

A time unit described in the embodiments of this application may be a subframe, a slot, a mini-slot, or a transmission time interval (TTI), and a first time unit is used as an example of a time unit. Alternatively, the first time unit may be understood as a time unit in which an SRS needs to be transmitted currently.

A total bandwidth to be measured represents a frequency hopping range, and is one element in a bandwidth set configured by using a user-level configuration parameter $C_{SRS}$, and denoted as $b_{hop}$ in this application.

In addition, that "the total bandwidth to be measured includes K non-overlapping frequency resources" and "a total quantity K of hops" described in the embodiments of this application actually describe the total bandwidth to be measured from different perspectives. In other words, the total bandwidth to be measured can be covered in measurement only after frequency hopping of K hops is performed. Each hop corresponds to a bandwidth occupied by one of the K non-overlapping frequency resources. In addition, a bandwidth occupied by each of the K non-overlapping frequency resources is an SRS bandwidth.

The user-level configuration parameter $C_{SRS}$ is used to configure the bandwidth set, where the bandwidth set includes a plurality of SRS bandwidths.

A user-level configuration bandwidth $B_{SRS}$ is an SRS bandwidth in the bandwidth set configured by using $C_{SRS}$.

The SRS bandwidth is a bandwidth used to transmit an SRS in a symbol.

For meanings of these parameters, refer to a related description in LTE. It should be noted that, in LTE, $C_{SRS}$ is a cell-level configuration parameter, whereas in NR, $C_{SRS}$ is a user-level configuration parameter.

In addition, two concepts easy to be mixed in the embodiments of this application are briefly distinguished. One is a quantity $N_{symb}^{SRS}$ of symbols that can be occupied by the SRS resource in a time. The other is a quantity of symbols in which the terminal device sends an SRS to the network device in a time unit. The former one may be considered as a configuration of the network device. The terminal device can send the SRS by using the configuration of the network device. In this case, the quantity of symbols used by the terminal device for sending the SRS is equal to $N_{symb}^{SRS}$. Alternatively, the terminal device may send the SRS by using a part of the SRS resource (for example, a part of frequency domain resource or a part of time domain resource) configured by the network device. In this case, the quantity of symbols used by the terminal device for sending the SRS is not equal to $N_{symb}^{SRS}$, and may be, for example, less than $N_{symb}^{SRS}$.

In addition, numbers "first", "second", and the like that appear in the embodiments of this application are merely used for distinguishing between different described objects, for example, for distinguishing between different frequency domain resources (for example, a first frequency domain resource and a second frequency domain resource), a threshold (for example, a first threshold, a second threshold, and a third threshold), or configuration information, and should not constitute a limitation on the technical solutions in the embodiments of this application.

Figure 2:
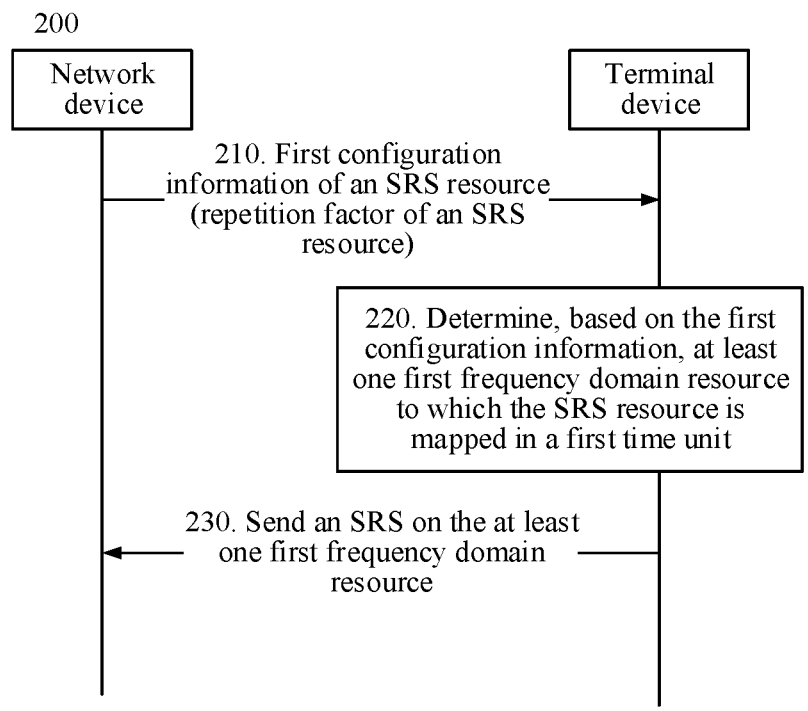
FIG. 2 a schematic interaction diagram of sending a reference signal according to an embodiment of this application.

FIG. 2 a schematic interaction diagram of sending a reference signal according to an embodiment of this application.

This specification describes the technical solutions in the embodiments of this application by using a sounding reference signal (SRS) as an example. The technical solutions in this application may be further applied to scenarios of transmission of other reference signals for channel measurement.

210. A network device sends first configuration information of an SRS resource to a terminal device. The terminal device receives the first configuration information of the SRS resource from the network device.

The first configuration information of the SRS resource is used to indicate time domain parameters configured by the network device for the SRS resource. Specifically, these time domain parameters include a slot-level time domain parameter and a symbol-level time domain parameter.

For a periodic or semi-persistent SRS resource, the slot-level time domain parameter includes a period and a time domain offset of the SRS resource.

For an aperiodic SRS resource, the slot-level time domain parameter includes a time domain offset of the SRS resource, or a minimum value of the time domain offset.

NR supports different subcarrier spacings and a relatively large carrier range. In addition, channel changing speeds are different at different carrier frequencies. For example, a channel changes quickly at a high frequency, and changes slowly at a low frequency. In addition, different subcarrier spacings correspond to different slot lengths. Therefore, considering all these factors, a same slot-level period corresponds to different absolute time lengths. For example, a time length of a 15 kHz slot may be four times a time length of a 60 kHz slot.

To consider measurement requirements of the terminal device on both the carrier frequency and the subcarrier spacing, this embodiment of this application provides the following three configuration solutions (denoted as Solution A, Solution B, and Solution C below).

Solution A

A relatively large period-configurable range is supported.

In Solution A, the network device may configure a slot-level parameter of an SRS resource based on Table 1. Compared with a configuration in LTE in which only a period ranging from 2 ms to 320 ms is supported, a configuration of 640 slots and 1280 slots is added. The network device can configure a relatively large slot-level period for a relatively large subcarrier spacing.

TABLE 1

| SRS slot configuration index ($I_{SRS}$) | Slot-level period $T_{SRS}$ | Slot offset $T_{offset}$ |
|---|---|---|
| 0-4 | 5 | $I_{SRS}$ |
| 5-14 | 10 | $I_{SRS} - 5$ |
| 15-34 | 20 | $I_{SRS} - 15$ |
| 35-74 | 40 | $I_{SRS} - 35$ |
| 75-154 | 80 | $I_{SRS} - 75$ |
| 155-314 | 160 | $I_{SRS} - 155$ |
| 315-634 | 320 | $I_{SRS} - 315$ |
| 635-1274 | 640 | $I_{SRS} - 635$ |
| 1275-2554 | 1280 | $I_{SRS} - 1275$ |
| 2555-4095 | reserved | reserved |

Alternatively, referring to Table 2, a case in which the period is 2 may not be included.

TABLE 2

| SRS slot configuration index ($I_{SRS}$) | Slot-level period $T_{SRS}$ | Slot Offset $T_{offset}$ |
|---|---|---|
| 2-6 | 5 | $I_{SRS} - 2$ |
| 7-16 | 10 | $I_{SRS} - 7$ |
| 17-36 | 20 | $I_{SRS} - 17$ |
| 37-76 | 40 | $I_{SRS} - 37$ |
| 77-156 | 80 | $I_{SRS} - 77$ |
| 157-316 | 160 | $I_{SRS} - 157$ |
| 317-636 | 320 | $I_{SRS} - 317$ |
| 637-1276 | 640 | $I_{SRS} - 637$ |
| 1277-2556 | 1280 | $I_{SRS} - 1277$ |
| 2557-4095 | reserved | reserved |

Alternatively, referring to Table 3, some periods includes a plurality of time offsets. Empty parts in Table 3 are not limited.

TABLE 3

| SRS slot configuration index ($I_{SRS}$) | Slot-level period $T_{SRS}$ | Slot offset $T_{offset}$ |
|---|---|---|
| 0 | 5 | {0, 1} |
| 1 | 5 | {0, 2} |
| 2 | 5 | {0, 3} |
| 3 | 5 | {0, 4} |
| 4 | 5 | {1, 2} |
| 5 | 5 | {1, 3} |
| 6 | 5 | {1, 4} |
| 7 | 5 | {2, 3} |
| 8 | 5 | {2, 4} |
| 9 | 5 | {3, 4} |
|  | 5 |  |
|  | 10 |  |
|  | 20 |  |
|  | 40 |  |
|  | 80 |  |
|  | 160 |  |
|  | 320 |  |
|  | 640 |  |
|  | 1280 |  |
|  | reserved |  |

Solution B

Different subcarrier spacings correspond to different configuration tables, or a group of subcarrier spacings correspond to a group of configuration tables.

For example, referring to Table 4 and Table 5, 15 kHz corresponds to a period of 2 to 320 slots, and 60 kHz corresponds to a period of 10 to 1280 slots.

TABLE 4

| SRS slot configuration index 15 kHz (relatively long slot) | Slot-level period 15 kHz $T_{SRS}$ (slot) | Slot offset 15 kHz $T_{offset}$ |
|---|---|---|
| 0-1 | 2 | $I_{SRS}$ |
| 2-6 | 5 | $I_{SRS} - 2$ |
| 7-16 | 10 | $I_{SRS} - 7$ |
| 17-36 | 20 | $I_{SRS} - 17$ |
| 37-76 | 40 | $I_{SRS} - 37$ |
| 77-156 | 80 | $I_{SRS} - 77$ |
| 157-316 | 160 | $I_{SRS} - 157$ |
| 317-636 | 320 | $I_{SRS} - 317$ |
| 636-639 | reserved | reserved |

TABLE 5

| SRS slot configuration index 60 kHz (relatively short slot) | Slot-level period 60 kHz $I_{SRS}$ (slot) | Slot offset 60 kHz $T_{offset}$ |
|---|---|---|
| 0-9 | 10 | $I_{SRS}$ |
| 10-29 | 20 | $I_{SRS} - 10$ |
| 30-69 | 40 | $I_{SRS} - 30$ |
| 70-149 | 80 | $I_{SRS} - 70$ |
| 150-309 | 160 | $I_{SRS} - 150$ |
| 310-629 | 320 | $I_{SRS} - 310$ |
| 630-1269 | 640 | $I_{SRS} - 630$ |
| 1270-2549 | 1280 | $I_{SRS} - 1270$ |
| 2550-4095 | reserved | reserved |

Alternatively, the case in which the period is 2 may not be included, or one period includes a plurality of offsets.

Solution C

Different carrier frequencies correspond to different configuration tables. For example, Table 4 and Table 5 in Solution B respectively correspond to carrier frequencies above 6 GHz and below 6 GHz. Alternatively, different carrier frequencies correspond to different period units. For example, in the tables in Solution A and Solution B, a slot is used as a unit of the period. However, in Solution C, a period unit corresponding to a carrier frequency below 6 GHz is $k=2^\mu$ slots, and a period unit corresponding to a carrier frequency above 6 GHz is $k=2^{\mu-2}$ slots. Referring to Table 6, $\mu$ is an index of a subcarrier spacing.

TABLE 6

| $\mu$ | Subcarrier spacing $\Delta f = 2^\mu \cdot 15$ [kHz] |
|---|---|
| 0 | 15 |
| 1 | 30 |
| 2 | 60 |
| 3 | 120 |
| 4 | 240 |
| 5 | 480 |

Alternatively, the case in which the period is 2 may not be included, or one period includes a plurality of offsets.

In addition, for an aperiodic SRS resource, the network device may configure or predefine a time interval between a PDCCH or a control resource set (CORESET) carrying DCI and the SRS resource, or a minimum value of the time interval.

For ease of description, a slot in which the PDCCH or the CORESET carrying the DCI is located is denoted as a slot m, and a slot in which the SRS resource is located is denoted as a slot n, where m≤n, and both m and n are positive integers.

Specifically, the period may be measured in units defined in optional cases listed below.

(1) A slot-level interval between the slot m and the slot n.

(2) A symbol-level interval between a symbol in which the PDCCH or the CORESET carrying the DCI is located and the first or the last symbol of the SRS resource in the slot n.

For the case (2), optionally, a starting symbol of the SRS resource does not need to be configured.

Optionally, optional values of the symbol-level interval fall within a particular range, ensuring that the SRS resource is mapped to symbols that can be used for sending an SRS, for example, the last six symbols of the slot n.

(3) A time interval is configured by the network device, and the time interval has a minimum value, where the minimum value may be predefined. For example, the minimum value may be predefined as four slots. Alternatively, the minimum value may be reported by the terminal device to the network device based on a measurement capability of the terminal device. Optionally, the network device may select a time interval from some candidate values and configure the time interval for the terminal device.

(4) The terminal device may report at least one of the following: a time interval, a minimum value of a time interval, and a candidate value of a time interval.

(5) The network device configures the time interval for the SRS resource.

Optionally, the network device configures a time interval for an SRS resource set including the SRS resource. When sending an SRS resource in an SRS resource set, the terminal device uses the time interval of the SRS resource set. In this case, optionally, the network device may not need to configure time interval information for each SRS resource in the SRS resource set. Alternatively, the terminal device determines a time interval between transmission of the DCI and transmission of the SRS resource based on both the time interval of the SRS resource set and the time interval of the SRS resource (for example, adding the two). The time interval of the SRS resource set and/or the time interval of the SRS resource may be determined based on an identifier of the SRS resource set or an identifier of the SRS resource. For example, the time interval is equal to an identifier value or a sum of an identifier value and an offset value.

The terminal device determines a time domain resource of the SRS resource based on the symbol or the slot in which the PDCCH or the CORESET carrying the DCI is located and the time interval. For example, the terminal device determines that m is a sum of n and the time domain interval. For another example, the terminal device determines a time domain resource of the SRS resource based on a sum of the symbol in which the PDCCH or the CORESET carrying the DCI is located and the time domain interval.

Optionally, the DCI may be used to trigger at least one SRS resource, or may be used to trigger at least one SRS resource set. When the DCI is used to trigger the SRS resource set, the DCI includes identification information used to indicate the SRS resource set or an identifier used to indicate the SRS resource set.

Optionally, the foregoing method for determining a time domain interval for an aperiodic SRS may be further applied to a semi-persistent SRS.

The semi-persistent SRS means that DCI or a MAC CE may be used to trigger to activate transmission of an SRS, and DCI or a MAC CE may be used to trigger to deactivate the transmission of the SRS. Alternatively, DCI or a MAC CE may be used to trigger to activate transmission of an SRS, and the transmission of the SRS is deactivated after a period of time. The period of time may be specified in a protocol (and does not need to be configured by the base station, locally prestored, or preconfigured) or configured by the base station. Alternatively, activation may be performed after a period of time after the configuration information is received, and DCI or a MAC CE is used to trigger deactivation, or deactivation is performed after a period of time. The period of time from receiving the configuration information to performing the activation may be specified in the protocol (and does not need to be configured by the base station, locally prestored, or preconfigured) or configured by the base station. The period of time from the activation to the deactivation may also be specified in the protocol (and does not need to be configured by the base station, locally prestored, or preconfigured) or configured by the base station.

Similar to the method for determining a time domain interval for an aperiodic SRS, the base station configures or predefines a first time interval and/or a second time interval. The first time interval is a time interval or a minimum value of the time interval between a PDCCH or a CORESET in which DCI activating a semi-persistent SRS resource is located or a PDSCH in which a MAC CE activating a semi-persistent SRS resource is located and the semi-persistent SRS resource. For example, the terminal device may start to perform transmission at a first transmission opportunity of the semi-persistent SRS after the time interval, where the transmission opportunity is determined based on time domain configuration information of the semi-persistent SRS. The second time interval is a time interval between a PDCCH or a CORESET in which DCI deactivating the semi-persistent SRS resource is located or a PDSCH in which a MAC CE deactivating the semi-persistent SRS resource is located and a time point at which transmission of the semi-persistent SRS resource is stopped or the SRS resource is transmitted for the last time. For example, the terminal device may stop transmitting the semi-persistent SRS after the time interval.

Optionally, specific methods for configuring and reporting a time interval are the same as those corresponding to the aperiodic SRS resource.

Optionally, the DCI or the MAC CE may be used to activate or deactivate at least one semi-persistent SRS resource, or may be used to activate or deactivate at least one semi-persistent SRS resource set. When the DCI or the MAC CE is used to activate or deactivate the semi-persistent SRS resource set, the DCI or the MAC CE includes identification information used to indicate the semi-persistent SRS resource set, an identifier used to indicate the SRS resource set, or an identifier of the semi-persistent SRS resource set in all semi-persistent SRS resource sets or in all SRS resource sets, or the DCI or the MAC CE provides support in a form of a bitmap. Each bit in the bitmap corresponds to one semi-persistent SRS resource set. A length of the bitmap is not less than a quantity of configured semi-persistent SRS resource sets, or equal to the quantity of semi-persistent SRS resource sets or a maximum quantity of semi-persistent SRS resource sets.

Optionally, some rows or some columns in the tables in the foregoing solutions may be separately used, or at least some rows or at least some columns may be used as a part of a complete configuration table. This is not limited herein.

Symbol-level time domain parameters of the SRS resource are described below.

In this embodiment of this application, the symbol-level time domain parameters of the SRS resource mainly include the following:

(1) A starting symbol of the SRS resource in a slot.

Because an SRS is usually configured in last M symbols in a slot, a starting symbol of the SRS resource in the slot is in the last M symbols in the slot. For example, if a starting symbol of the SRS resource in a slot is in the last six symbols of the slot, a position of the starting symbol of the SRS resource in the slot is the last six symbols.

(2) A quantity of symbols of the SRS resource.

The quantity of symbols of the SRS resource is a quantity (denoted as $N_{symb}^{SRS}$ below) of symbols occupied by the SRS resource in a slot, where $N_{symb}^{SRS}$ is a positive integer.

(3) A repetition factor of the SRS resource.

In this embodiment of this application, the repetition factor of the SRS resource is a quantity N of positions at which the SRS resource is mapped to a same subcarrier and mapped to at least one continuous symbol in a slot, where $N \geq 1$ and is an integer.

For brevity in description, the repetition factor of the SRS resource is denoted as $L_r$ below, that is, $L_r=N$.

In this embodiment of this application, the repetition factor may also be referred to as a repetition length.

Figure 3:
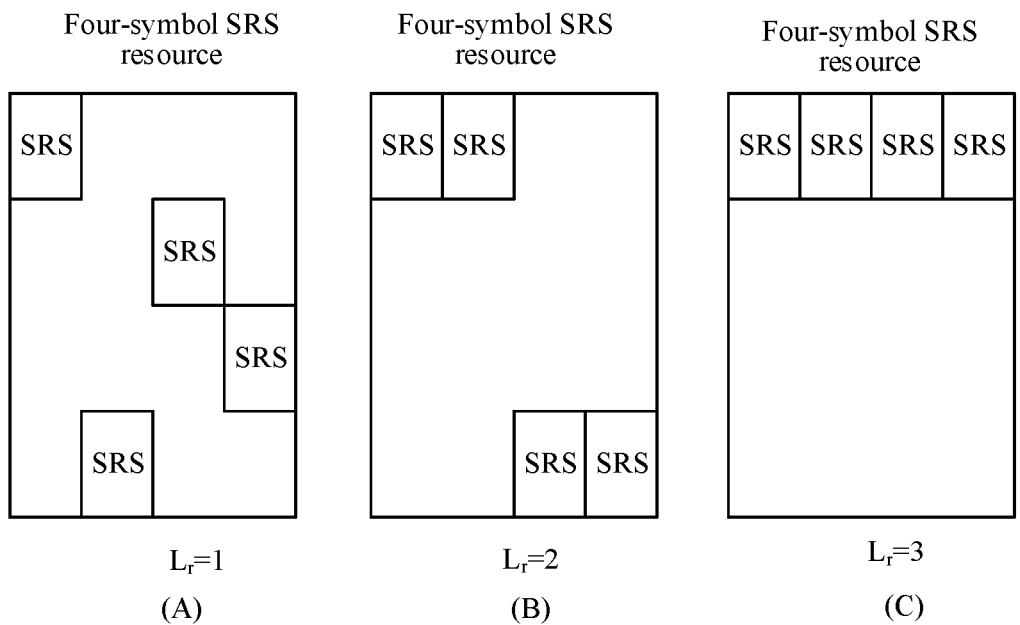
FIG. 3 is a schematic diagram of a repetition factor of an SRS resource.

FIG. 3 is a schematic diagram of a repetition length of an SRS resource. For example, in FIG. 3, a quantity of symbols of the SRS resource is equal to 4. As shown in (A) in FIG. 3, the repetition length of the SRS resource is equal to 1. As shown in (B) in FIG. 3, the repetition length of the SRS resource is equal to 2. As shown in (C) in FIG. 3, the repetition length of the SRS resource is equal to 4.

It may be understood that, the starting symbol of the SRS resource in the slot, the quantity of symbols of the SRS resource, and the repetition length of the SRS resource meet some constraint relationships. For example, the starting symbol of the SRS resource in the slot determines a maximum value of the quantity of symbols of the SRS resource. For example, if a start position of the SRS resource in the slot is the last symbol in the slot, the quantity of symbols of the SRS resource is only equal to 1. For another example, the quantity of symbols of the SRS resource determines the repetition length of the SRS resource. In other words, the repetition length of the SRS resource does not exceed the quantity of symbols of the SRS resource.

If a quantity of symbols in a slot is denoted as N, and indexes of symbols in the slot is 0 to N−1, where N is a positive integer, the constraint relationships may be represented as follows:

(1) A maximum value of the starting symbol of the SRS is not greater than N−M.

(2) A sum of the quantity of symbols of the SRS resource and the starting symbol of the SRS resource is not greater than N−1.

Optionally, the quantity of symbols of the SRS resource may be equal to 1, 2 or 4.

Optionally, the repetition factor of the SRS resource may be equal to 1, 2 or 4.

Further, considering these constraint relationships, this application proposes to jointly encode the three symbol-level time domain parameters of the SRS resource, to reduce resource overheads.

It may be understood that, the starting symbol of the SRS resource, the quantity of symbols of the SRS resource, and the repetition factor of the SRS resource may be jointly encoded by the network device, and then sent to the terminal device by using a piece of signaling. For example, this signaling may be the first configuration information in this embodiment of this application. The following describes Table 7 for joint encoding by using M=6 as an example.

TABLE 7

| Symbol configuration of an SRS resource $D_{SRS}$ | Starting symbol $l_{SRS}^{start}$ | Quantity $l_{SRS}^{symbol}$ of symbols of an SRS resource | Repetition length $L_r$ of an SRS resource (symbol) |
|---|---|---|---|
| 0-5 | 13-$D_{SRS}$ | 1 | 1 |
| 6-10 | 18-$D_{SRS}$ | 2 | 1 |
| 11-15 | 23-$D_{SRS}$ | 2 | 2 |
| 16-18 | 26-$D_{SRS}$ | 4 | 1 |
| 19-21 | 29-$D_{SRS}$ | 4 | 2 |
| 22-24 | 32-$D_{SRS}$ | 4 | 4 |
| 25-31 | reserved | reserved | reserved |

In an optional solution, the repetition length of the SRS resource may alternatively be separately configured, referring to Table 8 below.

TABLE 8

| Symbol configuration of an SRS resource $D_{SRS}$ | Starting symbol $l_{SRS}^{start}$ | Quantity $l_{SRS}^{symbol}$ of symbols of an SRS resource |
|---|---|---|
| 0-5 | 13-$D_{SRS}$ | 1 |
| 6-10 | 18-$D_{SRS}$ | 2 |
| 11-13 | 12-$D_{SRS}$ | 4 |
| 14-15 | reserved | reserved |

In addition, the repetition length of the SRS resource is configured as Table 9.

TABLE 9

| Configuration of a repetition length of an SRS resource | Repetition length $L_r$ of an SRS resource |
|---|---|
| 00 | 1 |
| 01 | 2 |
| 10 | 4 |
| 11 | reserved |

Optionally, some rows or some columns in the tables in the foregoing solutions may be separately used, or at least some rows or at least some columns may be used as a part of a complete configuration table. This is not limited herein.

220. The terminal device determines, based on time domain configuration information of the SRS resource, that the SRS resource is mapped to at least one first frequency domain position in a first time unit.

For an aperiodic SRS resource, the time domain configuration information of the SRS resource may be carried in downlink control information (DCI).

If a slot in which the terminal device receives the downlink control information is a slot n, the terminal device may send an SRS to the network device in a slot n+k, where k is a time domain offset of the SRS resource, and n and k are positive integers.

Figure 4:
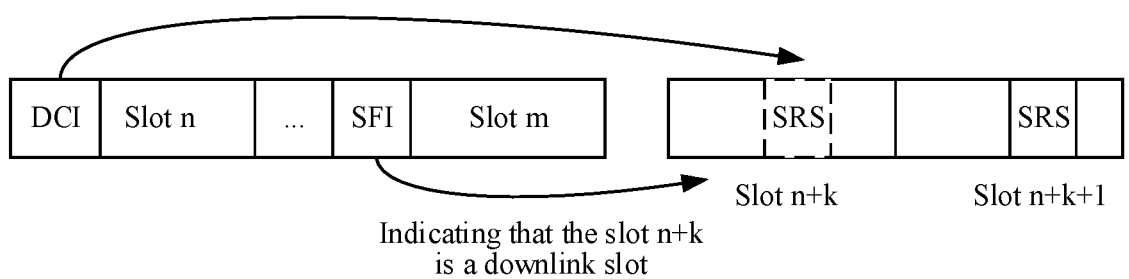
FIG. 4 is a schematic diagram of postponing sending an SRS by a terminal device.

If an SRS cannot be sent in a symbol that is configured in the slot n+k and that is used for sending an SRS, for example, the SRS resource and the PUCCH or the PUSCH are configured in a same symbol, or a slot format indicator (SFI) indicates that the SRS resource is a downlink resource or an unknown resource, the terminal device sends an SRS on a same symbol position in a slot n+k+1. FIG. 4 is a schematic diagram of postponing sending an SRS by a terminal device.

Further, if the SRS still cannot be sent in a symbol that is configured in the slot n+k+1 and that is used for sending an SRS, the terminal device sends the SRS in a slot n+k+2, and so on.

However, to avoid postponing sending the SRS for a plurality of times, the network device may preconfigure a maximum time domain offset t (where t>0 and is an integer) for sending the SRS. That is, an SRS that is triggered by DCI in the slot n will not be sent in a slot after a slot n+t.

The time domain offset t may be configured by using higher layer signaling and/or DCI of the network device. Alternatively, t may be predefined.

The following describes the process of determining, by the terminal device based on the first configuration information, at least one first frequency domain resource to which the SRS resource is mapped in a first time unit.

For ease of understanding, the following describes an example in which a time unit is a slot.

Specifically, the terminal device determines, based on the first configuration information of the SRS resource and a current slot, a count $n_{SRS}$ of for SRS sending, and then determines, based on $n_{SRS}$ a frequency domain resource to which the SRS resource is mapped in the current slot (where the frequency domain resource is referred to as a first frequency domain resource in this application, and a bandwidth of the first frequency domain resource is the SRS bandwidth and is configured by using $B_{SRS}$).

The following separately describes a periodic (including semi-persistent) SRS resource and an aperiodic SRS resource.

1. Periodic or Semi-Persistent SRS Resource.

For a periodic or semi-persistent SRS resource, $n_{SRS}$ represents a count of positions that can be used for transmitting an SRS on a same subcarrier in continuous symbols in a radio frame period. $n_{SRS}$ can be determined through calculation based on the following parameters: a system frame number, a slot number, a symbol number (namely, a symbol index), a starting symbol of the SRS resource, a quantity of symbols of the SRS resource, and a repetition factor of the SRS resource.

Specifically, $n_{SRS}$ may be determined through calculation according to the following formula (1):

$$n_{SRS}=\lfloor (N_{symb}^{SRS}\cdot\lfloor (n\cdot N_{frame}^{slot,\mu}+n_s)/T_{SRS}\rfloor + n_{symbol}-l_{start}^{SRS})/L_r\rfloor \quad (1)$$

Physical meanings of the parameters in the formula (1) are as follows: $N_{symb}^{SRS}$ represents the quantity of symbols of the SRS resource; n represents the system frame number; $N_{frame}^{slot,\mu}$ represents the slot number; $n_s$ represents a slot number in a frame; $T_{SRS}$ represents an SRS resource period; $n_{symbol}$ represents a symbol in a slot; $l_{start}^{SRS}$ represents the starting symbol of the SRS resource in a slot (the starting symbol of the SRS resource for short below); $L_r$ represents the repetition factor of the SRS resource; and the symbol $\lfloor \ \rfloor$ represents rounding down.

$n_{symbol}-l_{start}^{SRS}$ represents a difference between a number of a symbol in the slot and a number of the starting symbol of the SRS resource, and may be used as a separate variable, or may be obtained by using another expression, for example, determined based on a number of a symbol in a subframe or a frame, the starting symbol of the SRS resource, and a subframe number.

$\lfloor (n_s\times N_{frame}^{slot,\mu}+n_s)/T_{SRS}\rfloor$ represents a sequence number of the current slot in all slots that can be used to send the SRS in a frame period, and may be obtained through calculation by using another equivalent expression. $N_{symb}^{SRS}\cdot\lfloor (n\times N_{frame}^{slot,\mu}+n_s)/T_{SRS}\rfloor$ represents a quantity of all symbols that can be used to send the SRS in a frame period by the current slot, and may be obtained through calculation by using another equivalent expression.

Optionally, $n_{SRS}$ in the formula (1) may be a calculation method in a case, and it is not excluded that $n_{SRS}$ is calculated according to another formula in another case.

2. Aperiodic SRS Resource.

(1) It is assumed that the aperiodic SRS resource supports only intra-slot frequency hopping.

In this case, $n_{SRS}$ represents a count of positions at which an SRS resource triggered this time is transmitted on a same subcarrier and continuous symbols. $n_{SRS}$ may be determined through calculation based on the following parameters: a starting symbol of the SRS resource in a slot, a symbol number, and a repetition factor (denoted as $L_r$) of the SRS resource.

Specifically, $n_{SRS}$ may be determined through calculation according to the following formula (2):

$$n_{SRS}=\lfloor (n_{symbol}-l_{start}^{SRS})/L_r\rfloor \quad (2)$$

Optionally, a quantity of symbols for SRS transmission is the smaller one of a quantity of symbols of the SRS resource and a product of a total quantity of hops and the repetition factor. Therefore, when the quantity of symbols $N_{symb}^{SRS}$ of the SRS resource is less than the product K·N of the total quantity of hops and the repetition factor, an SRS is sent for times of only the quantity $N_{symb}^{SRS}$ of symbols of the SRS resource, that is, transmission is not performed on all hops. Alternatively, when the quantity $N_{symb}^{SRS}$ of symbols of the SRS resource is greater than the product K·N of the total quantity of hops and the repetition factor, an SRS is transmitted only in K·N symbols of the SRS resource, and the SRS is not transmitted in a remaining symbol of the SRS resource. Optionally, the remaining symbol of the SRS resource may be used to transmit another uplink channel (for example, a PUSCH) or may not be used for transmission, or may be used to transmit another SRS.

$n_{symbol}-l_{start}^{SRS}$ represents a difference between a number of a symbol in the slot and a number of the starting symbol of the SRS, and may be used as a separate variable, or may be obtained by using another expression, for example, determined based on a number of a symbol in a subframe or a frame, the starting symbol of the SRS, and a subframe number. The slot herein is determined based on the time interval described in step 210 and the resource on which the PDCCH or the CORESET that carries the DCI used to trigger SRS transmission is located.

For example, the constraint condition may be expressed as the following formula (3):

$$0 \le n_{SRS} \le \left\{ N_{symb}^{SRS}/L_r, \prod_{b'=b_{hop}+1}^{B_{SRS}} N_b - 1 \right\} \quad (3)$$

Alternatively, the constraint condition may be expressed as the following formula (4):

$$n_{SRS} = \left\{ \prod_{b'=b_{hop}+1}^{B_{SRS}} N_{b'} - 1, \lfloor (n_{symbol} - l_{start}^{SRS})/L_r \rfloor \right\} \quad (4)$$

(2) It is assumed that the aperiodic SRS resource supports intra-slot frequency hopping and inter-slot frequency hopping.

In this case, $n_{SRS}$ represents a count of positions at which an SRS resource triggered this time is transmitted on a same subcarrier and continuous symbols. $n_{SRS}$ may be determined through calculation based on the following parameters: a starting symbol of the SRS resource, a quantity of symbols of the SRS resource, a repetition factor of the SRS resource, a symbol number, a time difference between triggering DCI and a current slot, and a time domain offset. The time domain offset described herein is the time interval in step 210 in the foregoing description.

Specifically, $n_{SRS}$ may be determined through calculation according to the following formula (5):

$$n_{SRS} = \lfloor (N_{symb}^{SRS} \cdot (n_s^\Delta - T_{offset}) + n_{symbol} - l_{start}^{SRS})/L_r \rfloor \quad (5)$$

Herein, a maximum value of $n_{SRS}$ is a total quantity of hops.

$n_{symbol}-l_{start}^{SRS}$ represents a difference between a number of a symbol in the slot and a number of the starting symbol of the SRS, and may be used as a separate variable, or may be obtained according to another expression, for example, determined based on a number of a symbol in a subframe or a frame, the starting symbol of the SRS, and a subframe number.

$n_s^\Delta$ is the time difference between DCI triggering and the current slot.

$(n_s^\Delta - T_{offset})$ represents a difference between a number of the current slot and a number of a slot in which the aperiodic SRS is transmitted for the first time, and may be obtained through calculation by using another equivalent method.

$N_{symb}^{SRS} \cdot (n_s^\Delta - T_{offset})$ represents a quantity of all symbols that can be used to transmit the aperiodic SRS starting from the first time of transmission of the aperiodic SRS until the current slot, and may be obtained through calculation according to another equivalent expression.

After determining $n_{SRS}$ the terminal device can determine, based on $n_{SRS}$ at least one frequency domain resource (referred to as the first frequency domain resource in this application) to which the SRS resource is mapped in the current slot.

230. The terminal device sends an SRS to the network device on the determined at least one first frequency domain resource.

After the terminal device determines the at least one first frequency domain resource to which the SRS resource is mapped in the current slot in step 220, the terminal device sends the SRS to the network device on the at least one first frequency domain resource in step 230.

A person skilled in the art should understand that the process in which the terminal device sends the SRS to the network device on the at least one first frequency domain resource is a frequency hopping process.

In this embodiment of this application, the network device can support a plurality of frequency hopping manners by configuring the repetition factor of the SRS resource. For example, the network device can support inter-slot frequency hopping, inter-slot frequency hopping and frequency hopping on each symbol in a slot, inter-slot frequency hopping and frequency hopping on every two symbols in a slot, and frequency hopping of an aperiodic SRS. This can improve frequency hopping flexibility.

In the method 200, the terminal device sends the SRS to the network device on the determined at least one first frequency domain resource.

Optionally, the terminal device may send the SRS on each of the at least one first frequency domain resource. Alternatively, to reduce a time for measuring the total bandwidth to be measured, this application further provides some frequency hopping manners below, so that the terminal device can send the SRS on some resource blocks (RB) of the at least one first frequency domain resource.

Manner 1

The terminal device determines, based on the first configuration information and second configuration information, at least one second frequency domain resource to which the SRS resource is mapped in the first time unit, where the second frequency domain resource is a part of the first frequency domain resource. The terminal device sends the SRS to the network device on the at least one second frequency domain resource.

In Manner 1, in addition to configuring the slot-level time domain parameter and the symbol-level parameter time domain that are indicated by the first configuration information, the network device further configures the second configuration information. Based on the first configuration information and the second configuration information, the terminal device can determine the at least one second frequency domain resource based on the at least one first frequency domain resource. The second frequency domain resource is a part of the first frequency domain resource.

Optionally, the second configuration information is used to indicate an SRS bandwidth parameter and an SRS bandwidth position parameter.

It should be noted that, the SRS bandwidth parameter is used to determine a bandwidth occupied by the second frequency domain resource. The SRS bandwidth position parameter is used to determine a position of the bandwidth occupied by the second frequency domain resource in a bandwidth occupied by the first frequency domain resource.

In the following description, the SRS bandwidth parameter is denoted as $b_{subband}$, and the SRS bandwidth position parameter is denoted as $b_{subband}^{offset}$.

It may be understood that, $b_{subband}$ is actually used to configure a size of a bandwidth actually used when the terminal device sends the SRS. A value range of $b_{subband}$ is $B_{SRS} \leq b_{subband} \leq 3$, and a specific value of the bandwidth configured by $b_{subband}$ may be obtained by querying an SRS bandwidth configuration table.

$b_{subband}^{offset}$ is used to configure a position, in the SRS bandwidth, of the bandwidth actually used when the terminal device sends the SRS. A value range of $b_{subband}^{offset}$ is $0 \leq b_{subband}^{offset} \leq \Pi_{b=B_{SRS}+1}^{b_{subband}} N_b - 1$. If one user-level SRS bandwidth includes a maximum of k bandwidths corresponding to $b_{subband}$, a specific value of $b_{subband}^{offset}$ should be $0 \leq b_{subband}^{offset} \leq k$, where k is a positive integer.

The following describes an example of a configuration table applicable to this embodiment of this application, referring to Table 10.

TABLE 10

| $C_{SRS}$ | $B_{SRS}=0$ | | $B_{SRS}=1$ | | $B_{SRS}=2$ | | $B_{SRS}=3$ | |
|---|---|---|---|---|---|---|---|---|
| | $m_{SRS,0}$ | $N_0$ | $m_{SRS,1}$ | $N_1$ | $m_{SRS,2}$ | $N_2$ | $m_{SRS,3}$ | $N_3$ |
| 0 | 4 | 1 | 4 | 1 | 4 | 1 | 4 | 1 |
| 1 | 8 | 1 | 4 | 2 | 4 | 1 | 4 | 1 |
| 2 | 12 | 1 | 4 | 3 | 4 | 1 | 4 | 1 |
| 3 | 16 | 1 | 4 | 4 | 4 | 1 | 4 | 1 |
| 4 | 16 | 1 | 8 | 2 | 4 | 2 | 4 | 1 |
| 5 | 20 | 1 | 4 | 5 | 4 | 1 | 4 | 1 |
| 6 | 24 | 1 | 4 | 6 | 4 | 1 | 4 | 1 |
| 7 | 24 | 1 | 12 | 2 | 4 | 3 | 4 | 1 |
| 8 | 28 | 1 | 4 | 7 | 4 | 1 | 4 | 1 |
| 9 | 32 | 1 | 16 | 2 | 8 | 2 | 4 | 2 |
| 10 | 36 | 1 | 12 | 3 | 4 | 3 | 4 | 1 |
| 11 | 40 | 1 | 20 | 2 | 4 | 5 | 4 | 1 |
| 12 | 48 | 1 | 16 | 3 | 8 | 2 | 4 | 2 |
| 13 | 48 | 1 | 24 | 2 | 12 | 2 | 4 | 3 |
| 14 | 52 | 1 | 4 | 13 | 4 | 1 | 4 | 1 |
| 15 | 56 | 1 | 28 | 2 | 4 | 7 | 4 | 1 |
| 16 | 60 | 1 | 20 | 3 | 4 | 5 | 4 | 1 |
| 17 | 64 | 1 | 32 | 2 | 16 | 2 | 4 | 4 |
| 18 | 72 | 1 | 24 | 3 | 4 | 6 | 4 | 1 |
| 19 | 72 | 1 | 36 | 2 | 12 | 3 | 4 | 1 |
| 20 | 76 | 1 | 4 | 19 | 4 | 1 | 4 | 1 |
| 21 | 80 | 1 | 40 | 2 | 20 | 2 | 4 | 5 |
| 22 | 88 | 1 | 44 | 2 | 11 | 4 | 4 | 1 |
| 23 | 96 | 1 | 32 | 3 | 16 | 2 | 4 | 4 |
| 24 | 96 | 1 | 48 | 2 | 24 | 2 | 4 | 6 |
| 25 | 104 | 1 | 52 | 2 | 4 | 13 | 4 | 1 |
| 26 | 112 | 1 | 56 | 2 | 28 | 2 | 4 | 7 |
| 27 | 120 | 1 | 60 | 2 | 20 | 3 | 4 | 5 |
| 28 | 120 | 1 | 40 | 3 | 8 | 5 | 4 | 2 |
| 29 | 120 | 1 | 24 | 5 | 12 | 2 | 4 | 1 |
| 30 | 128 | 1 | 64 | 2 | 32 | 2 | 4 | 8 |
| 31 | 128 | 1 | 64 | 2 | 16 | 4 | 4 | 4 |
| 32 | 128 | 1 | 16 | 8 | 8 | 2 | 4 | 2 |
| 33 | 132 | 1 | 44 | 3 | 4 | 11 | 4 | 1 |
| 34 | 136 | 1 | 68 | 2 | 4 | 17 | 4 | 1 |
| 35 | 144 | 1 | 72 | 2 | 36 | 2 | 4 | 9 |
| 36 | 144 | 1 | 48 | 3 | 24 | 2 | 12 | 2 |
| 37 | 144 | 1 | 48 | 3 | 16 | 3 | 4 | 4 |
| 38 | 144 | 1 | 16 | 9 | 8 | 2 | 4 | 2 |
| 39 | 152 | 1 | 76 | 2 | 4 | 19 | 4 | 1 |
| 40 | 160 | 1 | 80 | 2 | 40 | 2 | 4 | 10 |
| 41 | 160 | 1 | 80 | 2 | 20 | 4 | 4 | 5 |
| 42 | 160 | 1 | 32 | 5 | 16 | 2 | 4 | 4 |
| 43 | 168 | 1 | 84 | 2 | 28 | 3 | 4 | 7 |
| 44 | 176 | 1 | 88 | 2 | 44 | 2 | 4 | 11 |
| 45 | 184 | 1 | 92 | 2 | 4 | 23 | 4 | 1 |
| 46 | 192 | 1 | 96 | 2 | 48 | 2 | 4 | 12 |
| 47 | 192 | 1 | 96 | 2 | 24 | 4 | 4 | 6 |
| 48 | 192 | 1 | 64 | 3 | 16 | 4 | 4 | 4 |
| 49 | 192 | 1 | 24 | 8 | 8 | 3 | 4 | 2 |
| 50 | 208 | 1 | 104 | 2 | 52 | 2 | 4 | 13 |

TABLE 10-continued

| $C_{SRS}$ | $B_{SRS}=0$ | | $B_{SRS}=1$ | | $B_{SRS}=2$ | | $B_{SRS}=3$ | |
|---|---|---|---|---|---|---|---|---|
| | $m_{SRS,0}$ | $N_0$ | $m_{SRS,1}$ | $N_1$ | $m_{SRS,2}$ | $N_2$ | $m_{SRS,3}$ | $N_3$ |
| 51 | 216 | 1 | 108 | 2 | 36 | 3 | 4 | 9 |
| 52 | 224 | 1 | 112 | 2 | 56 | 2 | 4 | 14 |
| 53 | 240 | 1 | 120 | 2 | 60 | 2 | 4 | 15 |
| 54 | 240 | 1 | 80 | 3 | 20 | 4 | 4 | 5 |
| 55 | 240 | 1 | 48 | 5 | 16 | 3 | 8 | 2 |
| 56 | 240 | 1 | 24 | 10 | 12 | 2 | 4 | 3 |
| 57 | 256 | 1 | 128 | 2 | 64 | 2 | 4 | 16 |
| 58 | 256 | 1 | 128 | 2 | 32 | 4 | 4 | 8 |
| 59 | 256 | 1 | 16 | 16 | 8 | 2 | 4 | 2 |
| 60 | 264 | 1 | 132 | 2 | 44 | 3 | 4 | 11 |
| 61 | 272 | 1 | 136 | 2 | 68 | 2 | 4 | 17 |
| 62 | 272 | 1 | 136 | 2 | 44 | 4 | 4 | 11 |
| 63 | 272 | 1 | 16 | 17 | 8 | 2 | 4 | 2 |

Figure 5:
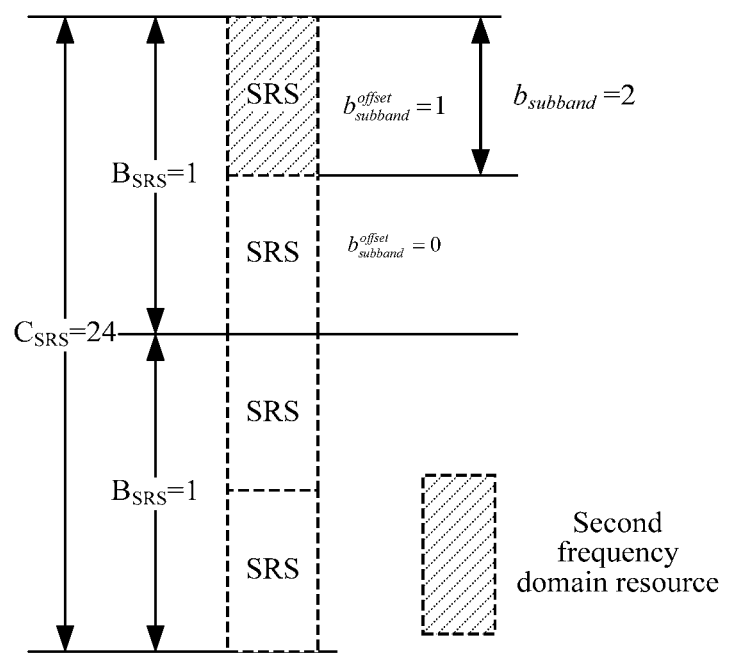
FIG. 5 is a schematic diagram of determining a second frequency domain resource according to an embodiment of this application.

The following describes an example with reference to FIG. 5.

FIG. 5 is a schematic diagram of determining the second frequency domain resource.

In FIG. 5, user-level configuration parameters configured by the network device are $C_{SRS}=24$ and $B_{SRS}=1$. If the network device configures that $b_{subband}=2$, and $b_{subband}^{offset}=1$, the terminal device sends the SRS only on a subband of a user-level SRS bandwidth. The subband of the user-level SRS bandwidth is the second frequency domain resource described in this embodiment of this application.

A quantity of resource blocks RBs occupied by the second frequency domain resource in frequency domain is represented as $m_{SRS,subband}$, and $m_{SRS,subband}$ may be obtained by querying the SRS bandwidth configuration table.

It may be understood that, FIG. 5 describes an example in which there is only one second frequency domain resource, and when there are at least two second frequency domain resources, a start frequency domain position of the at least two second frequency domain resources may be determined through calculation according to the following formula (6):

$$k_0^{(p)} = \bar{k}_0^{(p)} + b_{subband}^{offset} M_{sc,b_{subband}}^{RS} + \sum_{b=0}^{B} K_{TC} M_{sc,b}^{RS} n_b \quad (6)$$

Optionally, in Manner 1, concepts of $b_{subband}$ and $B_{SRS}$ may be interchangeable. $B_{SRS}$ is used to indicate the size of the bandwidth actually used when the terminal device sends the SRS. $b_{subband}$ is used to indicate the user-level SRS bandwidth.

Manner 2

The terminal device determines, based on the first configuration information and third configuration information, at least one third frequency domain resource to which the SRS resource is mapped in the first time unit, where a set including the at least one third frequency domain resource is a subset of a set including the at least one first frequency domain resource. The terminal device sends the SRS to the network device on the at least one third frequency domain resource.

In Manner 2, in addition to configuring the first configuration information as described above, the network device further configures the third configuration information. Based on the first configuration information and the third configuration information, the terminal device can determine the at least one third frequency domain resource based on the at least one first frequency domain resource. The set including the at least one third frequency domain resource is a subset of the set including the at least one first frequency domain resource in one or more time units.

In Manner 2, the third configuration information may be used to indicate a quantity $t_{symbol}^{SRS}$ of reference symbols.

In this application, the quantity $t_{symbol}^{SRS}$ of reference symbols is used to determine at least one first frequency domain resource occupied by the SRS resource in the first time unit (for example, a slot), where $t_{symbol}^{SRS} > 1$ and is an integer.

It should be noted that, a value range of the quantity $t_{symbol}^{SRS}$ of reference symbols is greater than or equal to the quantity $N_{symb}^{SRS}$ of symbols of the SRS resource.

Specifically, in Manner 2, for a periodic or semi-persistent SRS resource, the terminal device may calculate $n_{SRS}$ according to the following formula (7):

$$n_{SRS} = \lfloor (t_{symbol}^{SRS} \cdot \lfloor (n \times N_{frame}^{slot,\mu} + n_s)/T_{SRS} \rfloor + n_{symbol} - l_{start}^{SRS})/L_r \rfloor \quad (7)$$

A person skilled in the art may understand that, comparing the formula (7) with the foregoing formula (1), the parameter $N_{symb}^{SRS}$ is changed to $t_{symbol}^{SRS}$, and other parameters for calculating $n_{SRS}$ remain the same. $N_{symb}^{SRS}$ is a quantity of symbols that can be occupied by the SRS resource in a slot. Therefore, when a value of $t_{symbol}^{SRS}$ is greater than that of $N_{symb}^{SRS}$, a different value of $n_{SRS}$ is obtained through calculation.

In other words, according to the formula (7), frequency hopping over $t_{symbol}^{SRS}$ symbols is calculated, but the terminal device actually sends the SRS only on $N_{symb}^{SRS}$ symbols. In other words, there are $(t_{symbol}^{SRS} - N_{symb}^{SRS})$ symbols in which no SRS is sent. Therefore, the terminal device can send the SRS only on a part of the first frequency domain resource. The part of the first frequency domain resource herein is the at least one third frequency domain resource described in this application. In other words, the set including the at least one third frequency domain resource is actually a subset of the set including the at least one first frequency domain resource.

Figure 6:
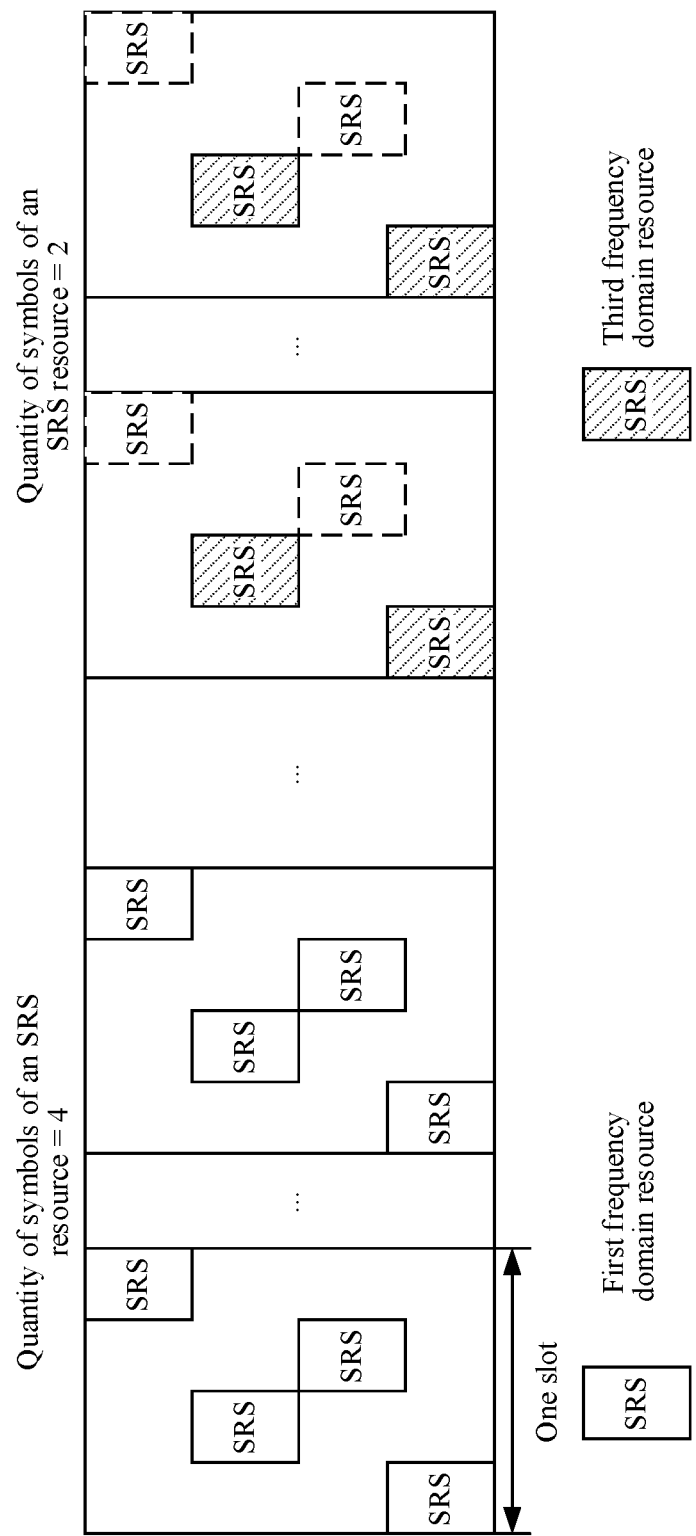
FIG. 6 is a schematic diagram of determining a third frequency domain resource according to an embodiment of this application.

The following describes an example with reference to FIG. 6.

FIG. 6 is a schematic diagram of determining the third frequency domain resource. As shown in FIG. 6, if the network device configures that $N_{symb}^{SRS} = 4$, for an SRS resource including four symbols, there are four first frequency domain positions in a slot. In this case, the terminal device sends the SRS on each first frequency domain resource. If the network device configures that $N_{symb}^{SRS} = 2$, and the terminal device performs calculation based on that one slot includes $t_{symbol}^{SRS} = 4$ symbols for frequency hopping, but the terminal device actually sends the SRS only in $N_{symb}^{SRS} = 2$ symbols, the terminal device can also send the SRS on some RBs.

It should be understood that, Manner 2 is not applicable to an aperiodic SRS resource that supports only intra-slot frequency hopping. Manner 2 is applicable to an aperiodic SRS resource that supports intra-slot frequency hopping and inter-slot frequency hopping. For example, a formula for calculating $n_{SRS}$ may be a formula (8):

$$n = \lfloor (t_{SRS}^{symbol} \cdot (n_s^{\Delta} - T_{offset}) + n_{symbol} - l_{start}^{SRS})/L_r \rfloor \quad (8)$$

In this embodiment of this application, if an aperiodic SRS resource supports only intra-slot frequency hopping, when the total quantity of hops K is greater than the quantity of symbols of the SRS resource, and sending is performed only at first $t_{symbol}^{SRS}$ hops, measurement of the total bandwidth to be measured may be inaccurate because the first $t_{symbol}^{SRS}$ symbol hops may not be evenly distributed in the total bandwidth to be measured.

It should be noted that, in this embodiment of this application, the total quantity of hops corresponding to the total bandwidth to be measured is denoted as K, $$K = \prod_{b'=b_{hop}+1}^{B_{SRS}} N_{b'}.$$

In other words, the total bandwidth to be measured includes K non-overlapping frequency resources. A bandwidth of each of the K non-overlapping frequency resources is an SRS bandwidth.

Figure 7:
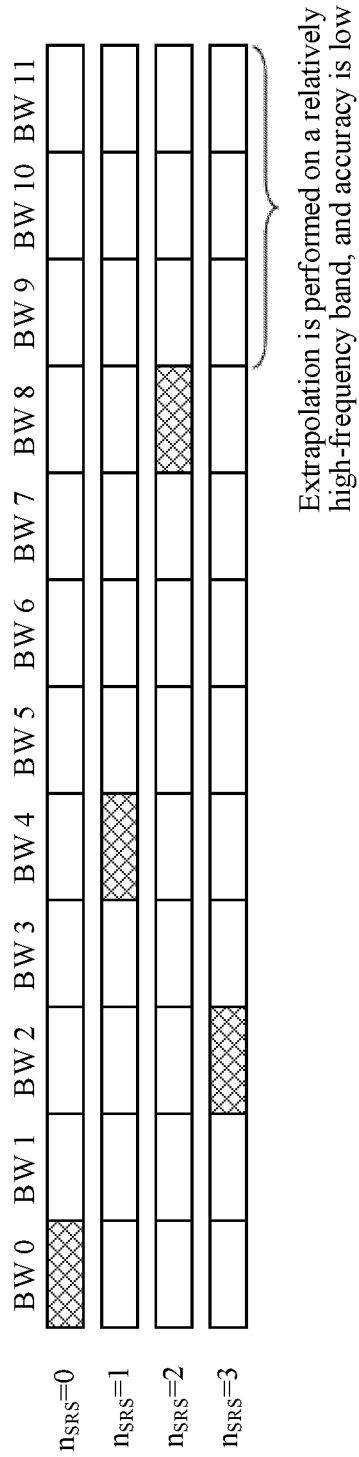
FIG. 7 is a schematic diagram of sending an SRS by a terminal device.

With reference to FIG. 7, the following describes an example in which measurement of the total bandwidth to be measured is inaccurate when the total quantity of hops is greater than the quantity of symbols of the SRS resource.

It is assumed that bandwidth configuration parameters in Table 11 are used.

TABLE 11

| $B_{SRS} = 0$ | | $B_{SRS} = 1$ | | $B_{SRS} = 2$ | | $B_{SRS} = 3$ | |
|---|---|---|---|---|---|---|---|
| $m_{SRS, 0}$ | $N_0$ | $m_{SRS, 1}$ | $N_1$ | $m_{SRS, 2}$ | $N_2$ | $m_{SRS, 3}$ | $N_3$ |
| 48 | 1 | 16 | 3 | 8 | 2 | 4 | 2 |

For example, if the network device configures that $b_{hop} = 0$, $B_{SRS} = 3$, $t_{symbol}^{SRS} = 4$, and $n_{RRC} = 0$, four hops at which the terminal device measures the total bandwidth to be measured may be shown in FIG. 7. FIG. 7 is a schematic diagram of sending an SRS by the terminal device. It can be learned from FIG. 7 that, after the terminal device performs the measurement at the four hops, a frequency hopping pattern is distributed in only first ¾ of the total bandwidth to be measured.

Figure 8:
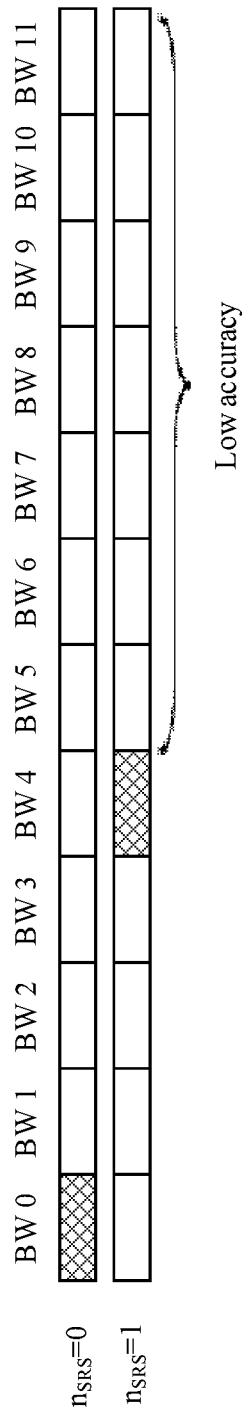
FIG. 8 is another schematic diagram of sending an SRS by a terminal device.

For another example, if the network device configures that $b_{hop} = 0$, $B_{SRS} = 3$, $t_{symbol}^{SRS} = 2$, and $n_{RRC} = 0$, two hops at which the terminal device measures the total bandwidth to be measured may be shown in FIG. 8. FIG. 8 is another schematic diagram of sending an SRS by the terminal device. Similarly, after the terminal device performs the measurement at the two hops, a frequency hopping pattern is distributed in only first ½ of the total bandwidth to be measured.

For the cases shown in FIG. 7 and FIG. 8, for relatively high-frequency bands related to no frequency hopping pattern, a channel measurement result can be obtained only through extrapolation, and therefore accuracy is relatively low.

Therefore, for this problem that occurs when an SRS is sent on an aperiodic SRS resource, this application provides some solutions, so that the frequency hopping pattern can evenly cover, as much as possible, the total bandwidth to be measured, thereby improving measurement accuracy.

Solution 1

A frequency separation between a first frequency domain position of the bandwidth occupied by the at least one first frequency domain resource and a first frequency domain position of the total bandwidth to be measured is not greater than a first threshold, and/or a frequency separation between a second frequency domain position of the bandwidth occupied by the at least one first frequency domain resource and a second frequency domain position of the total bandwidth to be measured is not greater than a second threshold. A satisfied relationship between the at least one first frequency domain resource and the total bandwidth to be measured is referred to as a constraint condition 1 below.

Herein, the first frequency domain position of the bandwidth occupied by the at least one first frequency domain resource may be a frequency domain position of a subcarrier corresponding to a lowest, highest, or center frequency in the bandwidth occupied by the at least one first frequency domain resource, or may be another frequency domain position adjacent to the frequency domain position of the subcarrier corresponding to the lowest, highest, or center frequency. The second frequency domain position of the bandwidth occupied by the at least one first frequency domain resource may be a frequency domain position of a subcarrier corresponding to a highest, lowest, or center frequency in the bandwidth occupied by the at least one first frequency domain resource, or may be another frequency domain position adjacent to the frequency domain position of the subcarrier corresponding to the highest, lowest, or center frequency.

Similarly, the first frequency domain position of the total bandwidth to be measured may be a frequency domain position of a subcarrier corresponding to a lowest, highest, or center frequency in the total bandwidth to be measured, or may be another frequency domain position adjacent to the frequency domain position of the subcarrier corresponding to the lowest, highest, or center frequency. The second frequency domain position of the total bandwidth to be measured may be a frequency domain position of a subcarrier corresponding to a highest, lowest, or center frequency in the total bandwidth to be measured, or may be another frequency domain position adjacent to the frequency domain position of the subcarrier corresponding to the highest, lowest, or center frequency.

The first threshold may be determined based on at least one of the following parameters: K, N, $N_{symb}^{SRS}$, the total bandwidth to be measured, and the user-level SRS bandwidth, and/or the second threshold may also be determined based on at least one of the following parameters: K, N, $N_{symb}^{SRS}$, the total bandwidth to be measured, and the user-level SRS bandwidth.

It may be understood that in the design idea of Solution 1, the frequency separation between the first frequency domain position of the bandwidth occupied by the at least one first frequency domain resource and the first frequency domain position of the total bandwidth to be measured should be not greater than the first threshold, and/or a frequency bandwidth between the second frequency domain position of the bandwidth occupied by the at least one first frequency domain resource and the second frequency domain position of the total bandwidth to be measured should be not greater than the second threshold.

In other words, according to the constraint condition 1, the at least one first frequency domain resource is not distributed only in a part of the total bandwidth to be measured, but cover a larger bandwidth range as much as possible, so that the measurement accuracy can be improved.

Specifically, there are several manners as described below in which a relationship between the determined at least one first frequency domain resource and the total bandwidth to be measured meet the constraint condition 1 described in Solution 1.

Manner A

In Manner A, it is assumed that a total of K hops are required for completing measurement of the total bandwidth to be measured, where $$K = \prod_{b'=b_{hop}+1}^{B_{SRS}} N_{b'}.$$

The K hops correspond to a total of $$K = \prod_{b'=b_{hop}+1}^{B_{SRS}} N_{b'}$$

nodes at a bottom layer of a frequency hopping tree-shaped structure. The K nodes are evenly divided into $N_{symbol}^{SRS}/L_r$ segments. Each segment is spaced by $$\text{round}\left(\frac{K}{t_{symbol}^{SRS}}\right) \cdot i$$

nodes with another one. An $i^{th}$ segment is located between nodes $$\text{round}\left(\frac{K}{N_{symb}^{SRS}/L_r}\right) \cdot i, \text{round}\left(\frac{K}{N_{symb}^{SRS}/L_r}\right) \cdot (i+1).$$

In a process of $N_{symb}^{SRS}/L_r$ hops, a counter flag(i) and a hop counter $NUM_i$ are set, where $i \in [0, N_{symb}^{SRS}/L_r)$. Initially, flag(i)=0, and $NUM_i=1$.

For a $K^{th}$ hop, $NU/M_k$ is calculated according to the following steps.

(1) A position $$n_{temp} = \sum_{b=0}^{B_{SRS}} \left[ n_b \cdot \prod_{b'=b_{hop}+1}^{B_{SRS}} N_{b'} \right]$$

of a node (denoted as a node A below) corresponding to $$n_{SRS} = \sum_{i=0}^{k-1} NUM_i - 1$$

is calculated according to a formula (9).

$$n_{SRS} = \begin{cases} 2N_{SP}n_f + 2(N_{SP}-1)\left\lfloor\frac{n_s}{10}\right\rfloor + \left\lfloor\frac{T_{offset}}{T_{offset\_max}}\right\rfloor, & \text{for 2 ms SRS periodicity of frame structure type 2} \\ \lfloor(n_f \times 10 + \lfloor n_s/2 \rfloor)/T_{SRS}\rfloor, & \text{otherwise} \end{cases} \quad (9)$$

(2) Assuming that the node A is located at the $i^{th}$ segment, that is, $$\left\lfloor \frac{n_{temp}}{N_{symb}^{SRS}/L_r} \right\rfloor \in [i, i+1).$$

If flag(i)=0, it is considered that a frequency hopping position is located at the node A, and step (3) is performed, or if flag(i)=1, $NUM_{k-1}=NUM_{k+1}$, and step (1) is performed again to recalculate the frequency hopping position.

(3) flag(i) is set to 1, and the process ends.

In addition, in Solution 1, a start position of a subband for sending the SRS is calculated according to the following formula (10):

$$n_{SRS} = \begin{cases} \lfloor (n_{symbol} - N_{start}^{SRS}/L_r)/L_r \rfloor, & \prod_{b'=b_{hop}+1}^{B_{SRS}} N_{b'} <= N_{symb}^{SRS}/L_r \\ \sum_{i=0}^{\lfloor (n_{symbol}-N_{start}^{SRS}/L_r)/L_r \rfloor} NUM_i - 1, & \text{otherwise} \end{cases} \quad (10)$$

The following describes, by using an example, the frequency hopping pattern determined according to the method in Solution 1.

First, it is assumed that bandwidth configurations shown in Table 12 are used.

TABLE 12

| $B_{SRS}=0$ | | $B_{SRS}=1$ | | $B_{SRS}=2$ | | $B_{SRS}=3$ | |
|---|---|---|---|---|---|---|---|
| $m_{SRS,0}$ | $N_0$ | $m_{SRS,1}$ | $N_1$ | $m_{SRS,2}$ | $N_2$ | $m_{SRS,3}$ | $N_3$ |
| 48 | 1 | 16 | 3 | 8 | 2 | 4 | 2 |

Figure 9:
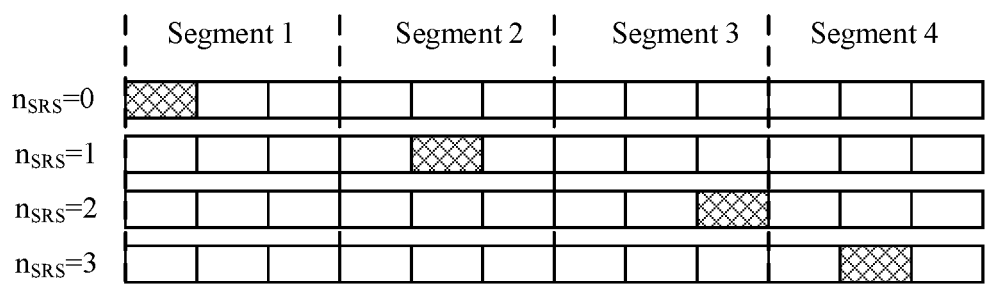
FIG. 9 shows a frequency hopping pattern based on a configuration according to an embodiment of this application.

If the network device configures that $b_{hop}=0$, $B_{SRS}=3$, $N_{symb}^{SRS}/L_r=4$, and $n_{RRC}=0$, $NUM_0=1$, $NUM_1=1$, $NUM_2=1$, and $NUM_3=3$ may be obtained through calculation according to the method in Solution 1. For the frequency hopping pattern, refer to FIG. 9. FIG. 9 shows a frequency hopping pattern based on a configuration according to this application.

Figure 10:
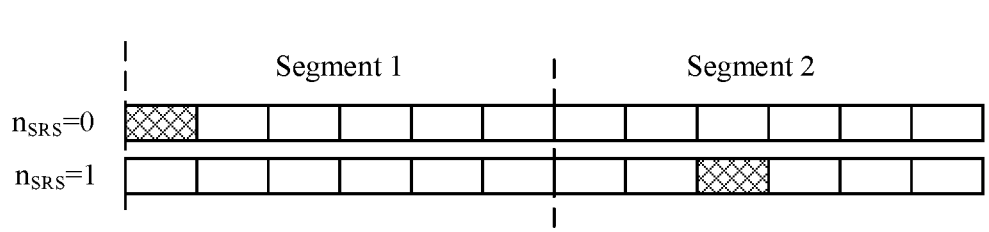
FIG. 10 shows a frequency hopping pattern based on another configuration according to an embodiment of this application.

If the network device configures that $b_{hop}=0$, $B_{SRS}=3$, $N_{symb}^{SRS}/L_r=2$, and $n_{RRC}=0$, $NUM_0=1$ and $NUM_1=2$ may be obtained through calculation according to the method in Solution 1. For the frequency hopping pattern, refer to FIG. 10. FIG. 10 shows a frequency hopping pattern based on another configuration according to this application.

It can be learned from FIG. 9 and FIG. 10 that, for $N_{symb}^{SRS}/L_r$ hops, according to the method provided in Solution 1, it can be ensured that $N_{symb}^{SRS}/L_r$ frequency domain positions at which the terminal device sends the SRS are located in $N_{symb}^{SRS}/L_r$ frequency bands that are evenly spaced. A frequency separation between a subcarrier corresponding to a lowest frequency in a frequency hopping bandwidth and a lowest subcarrier on the SRS resource is not greater than a threshold (that is, the first threshold). A frequency separation between a subcarrier corresponding to a highest frequency in the frequency hopping bandwidth and a subcarrier corresponding to a highest frequency on the SRS resource is not greater than a threshold (denoted as the second threshold herein for ease of distinguishing from the first threshold).

It may be understood that, the first threshold and the second threshold may be equal or unequal. For example, the first threshold and the second threshold may both be equal to $$\left[\text{round}\left(\frac{K}{N_{symb}^{SRS}/L_r}\right) - 1\right] \cdot B_{SRS},$$

that is, the frequency separation between the subcarrier corresponding to the lowest frequency in the total bandwidth to be measured and the subcarrier corresponding to the lowest frequency on the SRS resource is not greater than $$\left[\text{round}\left(\frac{K}{N_{symb}^{SRS}/L_r}\right) - 1\right]$$

user-level SRS bandwidths. Alternatively, the first threshold and the second threshold may be set separately. This is not limited in this embodiment of this application.

Solution 2

A frequency separation between third frequency domain positions of two adjacent first frequency domain resources in the at least one first frequency domain resource is not greater than a third threshold. The third threshold is determined based on at least one of the following parameters: K, $N_{symb}^{SRS}$, the total bandwidth to be measured, and the user-level SRS bandwidth.

Herein, the third frequency domain position may be a frequency domain position at which a subcarrier corresponding to a lowest, highest, or center frequency in the bandwidth occupied by the first frequency domain resource is located; a frequency domain position at which a subcarrier corresponding to a highest, lowest, or center frequency in the bandwidth occupied by the first frequency domain resource is located; or a frequency domain position at which a subcarrier corresponding to any frequency between the lowest frequency and the highest frequency is located.

In Solution 2, it is still assumed that a total of K hops are required for completing measurement of the total bandwidth to be measured, where $$K = \prod_{b'=b_{hop}+1}^{B_{SRS}} N_{b'}.$$

For an aperiodic SRS resource, it is assumed that $N_{symb}^{SRS}/L_r$ hops are required in a slot. In the total bandwidth to be measured, subcarrier positions $f_k$ to which $N_{symb}^{SRS}/L_r$ SRSs are mapped are correspondingly designed, where $k \in [1, N_{symb}^{SRS}/L_r]$. In frequency domain, a frequency separation between subcarriers to which adjacent SRS resources are mapped is denoted as $\Delta f_k$, where $k \in [1, N_{symb}^{SRS}/L_r-1]$.

In an optional solution, the frequency separation $\Delta f_k$ is determined based on the quantity $N_{symb}^{SRS}/L_r$ of hops in a slot and the total quantity of hops K, and $N_{symb}^{SRS}/L_r-1$ frequency separations $\Delta f_k$ should not be greater than the third threshold.

For example, the third threshold may be the user-level bandwidth $B_{SRS}$, that is, $|\Delta f_i - \Delta f_j| \leq B_{SRS}$.

According to Solution 2, it can be ensured that frequency domain positions for $N_{symb}^{SRS}/L_r$ hops are evenly distributed in the total bandwidth to be measured, and two frequency separations between third frequency domain positions of adjacent frequency domain resources on which the terminal device sends the SRS are basically the same.

Optionally, a starting subcarrier to which the SRS resource is mapped may be calculated according to the following formulas (11) to (13):

$$\bar{n} = \begin{cases} \left(n_{start} + \text{round}\left\{\left[\left(\frac{N_{symb}^{SRS}/L_r}{2} \cdot n_{SRS} + \left\lfloor\frac{n_{SRS}}{2}\right\rfloor\right) \bmod(N_{symb}^{SRS}/L_r)\right] \cdot \left(\frac{K-1}{N_{symb}^{SRS}/L_r - 1}\right)\right\}\right) \bmod K, & n_{start} = 0 \text{ or } K-1 \\ \left(n_{start} + \text{round}\left\{\left[\left(\frac{N_{symb}^{SRS}/L_r}{2} \cdot n_{SRS} + \left\lfloor\frac{n_{SRS}}{2}\right\rfloor\right) \bmod(N_{symb}^{SRS}/L_r)\right] \cdot \left(\frac{K}{N_{symb}^{SRS}/L_r}\right)\right\}\right) \bmod K, & \text{otherwise} \end{cases} \quad (11)$$

where $$n_{start} = \sum_{b=0}^{B_{SRS}} \left[ (\lfloor 4n_{RRC}/m_{SRS,b}\rfloor \bmod N_b) \cdot \prod_{b'=b+1}^{B_{SRS}} N_{b'} \right] \quad (12)$$

$$n_{SRS} = \lfloor (n_{symbol} - N_{sybm}^{SRS})/L_r \rfloor \quad (13)$$

Alternatively, a starting subcarrier to which the SRS resource is mapped may be calculated according to the following formulas (14) and (15):

$$k_0^{(p)} = \bar{k}_0^{(p)} + K_{TC} M_{sc,B_{SRS}}^{RS} \bar{n} \quad (14)$$

$$\bar{n} = \begin{cases} \left(n_{start} + \text{round}\left(n_{SRS} \cdot \frac{K-1}{N_{symb}^{SRS}/L_r - 1}\right)\right) \bmod K, & n_{start} = 0 \text{ or } n_{start} = K-1 \\ \left(n_{start} + \text{round}\left(n_{SRS} \cdot \frac{K}{N_{symb}^{SRS}/L_r}\right)\right) \bmod K, & \text{otherwise} \end{cases} \quad (15)$$

It should be understood that, formulas for calculating the frequency domain positions of the subcarriers to which the SRS resource is mapped in Solution 2 are not limited to the formulas above, and a formula in another form may also be used.

Figure 11:
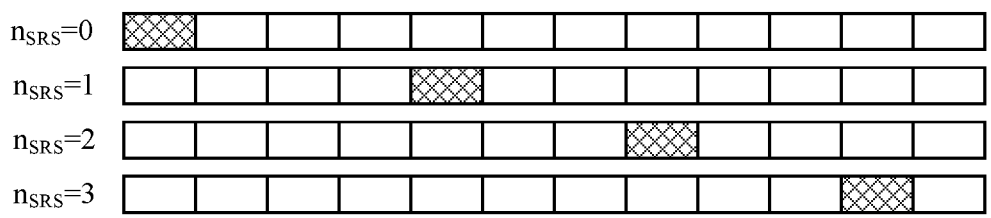
FIG. 11 shows a frequency hopping pattern based on a configuration.
Figure 12:
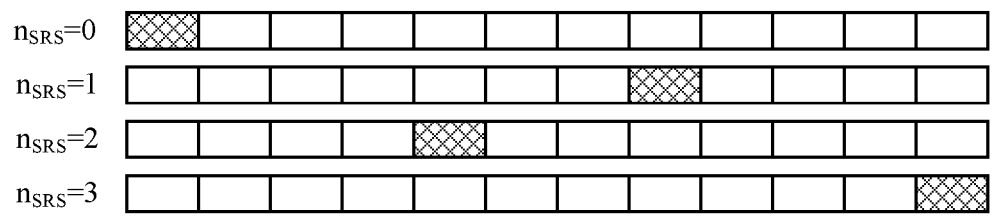
FIG. 12 shows a frequency hopping pattern based on another configuration.

With reference to FIG. 11 and FIG. 12, the following describes, by using an example, the frequency hopping pattern determined according to Solution 2.

First, it is assumed that bandwidth configurations shown in Table 13 are used.

TABLE 13

| $B_{SRS} = 0$ | | $B_{SRS} = 1$ | | $B_{SRS} = 2$ | | $B_{SRS} = 3$ | |
|---|---|---|---|---|---|---|---|
| $m_{SRS,0}$ | $N_0$ | $m_{SRS,1}$ | $N_1$ | $m_{SRS,2}$ | $N_2$ | $m_{SRS,3}$ | $N_3$ |
| 48 | 1 | 16 | 3 | 8 | 2 | 4 | 2 |

For example, if the network device configures that $b_{hop}=0$, $B_{SRS}=3$, $N_{symb}^{SRS}/L_r=4$, and $n_{RRC}=0$, and formulas (11) to (13) are used for calculation, a determined frequency hopping pattern is shown in FIG. 11. FIG. 11 shows an example of a frequency hopping pattern based on a configuration. If formulas (14) and (15) are used for calculation, a determined frequency hopping pattern is shown in FIG. 12. FIG. 12 shows another example of a frequency hopping pattern based on a configuration.

It can be seen from FIG. 11 and FIG. 12 that, the frequency hopping pattern is determined according to the solution provided in Solution 2, and after four hops, the frequency domain positions at which the terminal device sends the SRS are more evenly distributed in the entire bandwidth. This can improve channel measurement accuracy.

Figure 13:
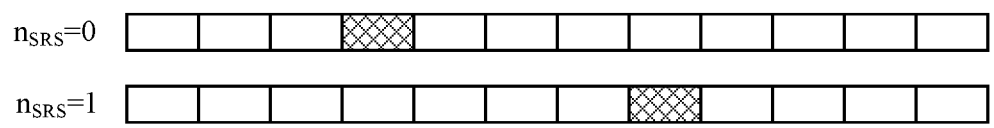
FIG. 13 shows a frequency hopping pattern based on a configuration according to an embodiment of this application.
Figure 14:
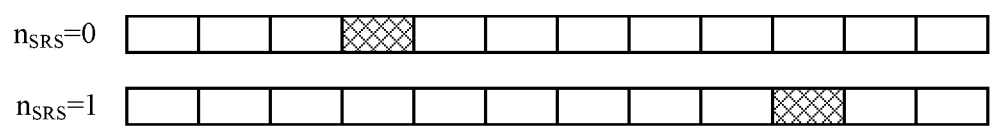
FIG. 14 shows a frequency hopping pattern based on another configuration according to an embodiment of this application.

For another example, if the network device configures that $b_{hop}=0$, $B_{SRS}=3$, $N_{symb}^{SRS}/L_r=2$, and $n_{RRC}=0$, and formulas (11) to (13) are used for calculation, a determined frequency hopping pattern is shown in FIG. 13. FIG. 13 shows an example of a frequency hopping pattern based on a configuration. If formulas (14) and (15) are used for calculation, a determined frequency hopping pattern is shown in FIG. 14. FIG. 14 shows another example of a frequency hopping pattern based on a configuration according to this application.

Manner 3

For an SRS resource including $N_{symb}^{SRS}$ symbols, the network device performs the following configuration by default:

(1) The total quantity of hops K is not equal to $N_{symb}^{SRS}$;

(2) the total quantity of hops K is greater than $N_{symb}^{SRS}$; or (3) the total quantity of hops K is less than $N_{symb}^{SRS}$.

In other words, the terminal device considers or assumes that the terminal device cannot receive indication information that is sent by the network device and that is used to indicate that K is not equal to $N_{symb}^{SRS}$;

the terminal device considers or assumes that the terminal device cannot receive indication information that is sent by the network device and that is used to indicate that K is greater than $N_{symb}^{SRS}$; or the terminal device considers or assumes that the terminal device cannot receive indication information that is sent by the network device and that is used to indicate that K is less than $N_{symb}^{SRS}$.

Based on the default configuration, if K is not equal to $N_{symb}^{SRS}$, K is greater than $N_{symb}^{SRS}$, or K is less than $N_{symb}^{SRS}$, the terminal device does not send the SRS on an SRS resource configured in a current slot.

It may be understood that, in Manner 3, only some RBs in the total bandwidth to be measured are measured, which can reduce time for measuring the total bandwidth.

Manner 4

The terminal device determines a frequency hopping pattern according to the following formulas (16), (17), and (18), to send the SRS on some RBs.

$$k_0^{(p)} = \bar{k}_0^{(p)} + \sum_{b=0}^{B_{SRS}} K_{TC} \cdot M_{sc,b}^{RS} \cdot n_b \quad (16)$$

$$n_b = \begin{cases} \lfloor 4n_{RRC}/m_{SRS,b}\rfloor \bmod N_b & \text{otherwise} \\ \{F_b(n_{SRS}) + \lfloor 4n_{RRC}/m_{SRS,b}\rfloor\} \bmod N_b & b_{hop} < b \le b_{minhop} \end{cases} \quad (17)$$

-continued $$F_b(n_{SRS}) = \begin{cases} (N_b/2) \left\lfloor \dfrac{n_{SRS} \bmod \prod_{b'=b_{hop}}^{b} N_{b'}}{\prod_{b'=b_{hop}}^{b-1} N_{b'}} \right\rfloor + \left\lfloor n_{SRS} \bmod \prod_{b'=b_{hop}}^{b} N_{b'} \right\rfloor & \text{if } N_b \text{ even} \\ \lfloor N_b/2 \rfloor \left\lfloor n_{SRS} / \prod_{b'=b_{hop}}^{b-1} N_{b'} \right\rfloor & \text{if } N_b \text{ odd} \end{cases} \quad (18)$$

In Manner 4, to implement even frequency hopping on some RBs, the network device configures a parameter $b_{minhop}$. A default setting of $b_{minhop}$ may be equal to $B_{SRS}$. To be specific, if the network device configures a value of $b_{minhop}$, the terminal device uses the value configured for $b_{minhop}$; or if the network device does not configure the value of $b_{minhop}$, $b_{minhop}$ is set to $B_{SRS}$. For example, a bandwidth of a fourth frequency domain resource can be determined based on a bandwidth set configured by using $C_{SRS}$. It can be learned according to formula (17) that, frequency hopping is performed only at $(b_{hop}+1)^{th}$ to $b_{minhop}^{th}$ layers in an SRS tree-shaped bandwidth structure, and is not performed at $(b_{minhop}+1)^{th}$ to $B_{SRS}^{th}$ layers. In this case, the SRS can be sent only on some RBs of the bandwidth occupied by each fourth frequency domain resource. A bandwidth corresponding to some RBs described herein is the bandwidth of the first frequency domain resource determined based on $B_{SRS}$.

Figure 15:
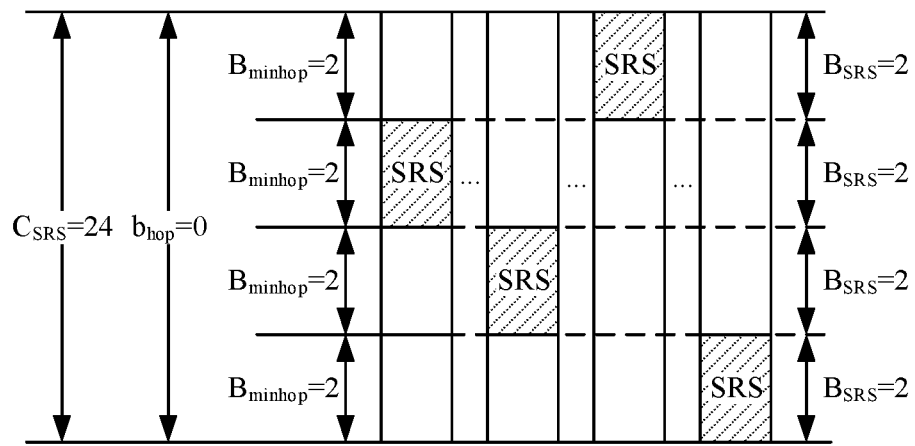
FIG. 15 shows a frequency hopping pattern based on a configuration according to an embodiment of this application.
Figure 16:
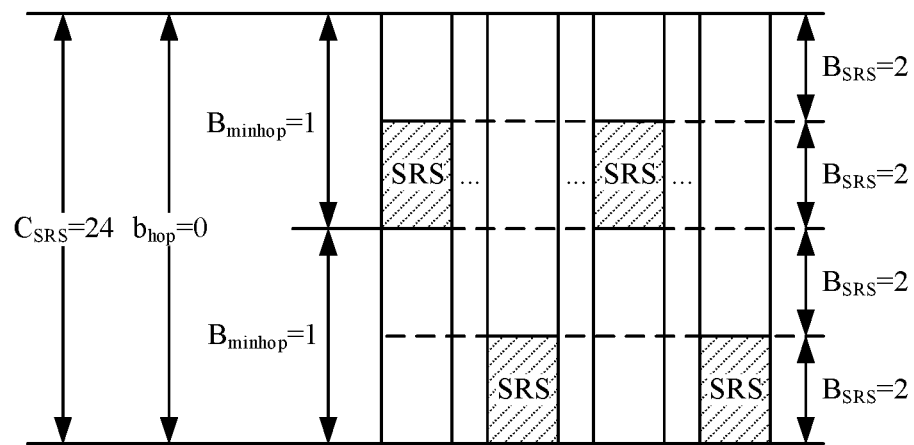
FIG. 16 shows a frequency hopping pattern based on another configuration according to an embodiment of this application.

With reference to FIG. 15 and FIG. 16, the following describes, by using an example, the frequency hopping pattern determined according to the method in Manner 4.

FIG. 15 shows a frequency hopping pattern based on a configuration according to an embodiment of this application. As shown in FIG. 15, if $C_{SRS}=24$, and $b_{minhop}$ and $B_{SRS}$ are both set to 2, the bandwidth of the fourth frequency domain resource is the same as the bandwidth of the first frequency domain resource. Therefore, the SRS can be sent, through frequency hopping, on all RBs in a range of the total bandwidth to be measured.

FIG. 16 shows a frequency hopping pattern based on another configuration according to an embodiment of this application. As shown in FIG. 16, if $C_{SRS}=24$, $b_{minhop}$ is set to 1, and $B_{SRS}$ is set to 2, the bandwidth of the fourth frequency domain resource is greater than the bandwidth of the first frequency domain resource. For example, in this embodiment, if the bandwidth of the fourth frequency domain resource is twice the bandwidth of the first frequency domain resource, it is determined according to the formula (17) that different fourth frequency domain resources are used for two consecutive times of SRS transmission, that is, frequency hopping is performed. However, a relative position of a first frequency domain resource on which the SRS is actually sent remains unchanged on the fourth frequency domain resource, that is, frequency hopping is not performed. Therefore, the SRS may be sent, through frequency hopping, in a bandwidth of a first frequency domain resource in each fourth frequency domain resource in the range of the bandwidth to be measured. In other words, the SRS is sent on some RBs in the range of the bandwidth to be measured, and it is further ensured that the RB blocks for sending the SRS are evenly distributed in the range of the bandwidth to be measured.

Optionally, the formulas (16) and (18) may have a different calculation method or expression form. This is not limited in the present invention.

Optionally, a value range of b in the formula (17) may be denoted as $0-b_{max}$, for example, $b_{max}=B_{SRS}$ or another values. A restrictive condition of the formula (17) may undergo the following equivalent change:

$$n_b = \qquad (19)$$
$$\begin{cases} \lfloor 4n_{RRC}/m_{SRS,b} \rfloor \bmod N_b & b > b_{minhop} \text{ or } b \le b_{hop} \\ \{F_b(n_{SRS}) + \lfloor 4n_{RRC}/m_{SRS,b} \rfloor\} \bmod N_b & b_{hop} < b \le b_{minhop} \end{cases}$$

or $$n_b = \begin{cases} \lfloor 4n_{RRC}/m_{SRS,b} \rfloor \bmod N_b & b > b_{minhop} \text{ or } b \le b_{hop} \\ \{F_b(n_{SRS}) + \lfloor 4n_{RRC}/m_{SRS,b} \rfloor\} \bmod N_b & \text{otherwise} \end{cases} \quad (20)$$

Alternatively, the value range of b is further limited in the restrictive condition, or another equivalent expression may be used. This is not limited in the present invention.

It should be noted that the symbol $N_{symbol}^{SRS}$ and the symbol $N_{symbol}^{SRS}$ represent a same meaning in this specification.

A predefinition may be specified in a communication protocol.

The indication information or the configuration information in this embodiment of this application may be transmitted by using one piece of signaling, or transmitted by using a plurality of pieces of signaling. The signaling may be carried in RRC signaling, MAC CE signaling, or DCI. The transmission by using a plurality of pieces of signaling may mean that the indication information or the configuration information is divided into a plurality of parts, and each part is transmitted by using one piece of signaling. Alternatively, a candidate set of the indication information or the configuration information may be first configured by using one piece of signaling, and then a piece of information in the candidate set is indicated by another piece of signaling. Alternatively, a candidate set of the indication information or the configuration information may be first configured by using one piece of signaling, then a subset of the candidate set is indicated by a second piece of signaling, and a piece of information in the subset of the candidate set is indicated by a third piece of signaling. Optionally, the indication information or the configuration information may alternatively be configured by using a combination of the foregoing plurality of methods.

The foregoing describes in detail the method for sending a reference signal in the embodiment of this application with reference to FIG. 1 to FIG. 16. The following describes a terminal device and a network device in the embodiments of this application with reference to FIG. 17 to FIG. 20.

Figure 17:
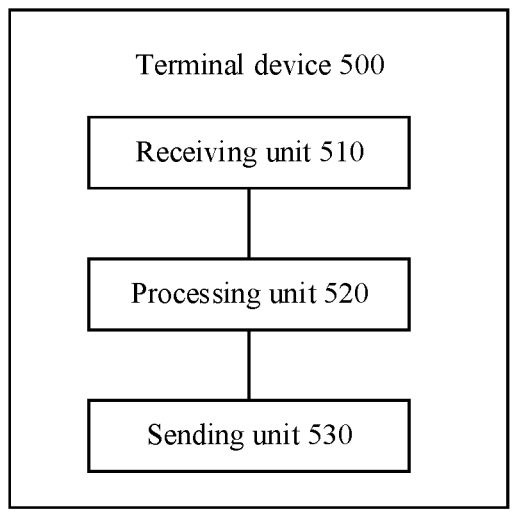
FIG. 17 is a schematic block diagram of a terminal device 500 according to an embodiment of this application.

FIG. 17 is a schematic block diagram of a terminal device 500 according to an embodiment of this application. As shown in FIG. 17, the terminal device 500 includes a receiving unit 510, a processing unit 520, and a sending unit 530.

The receiving unit 510 is configured to receive first configuration information of a sounding reference signal SRS resource from a network device, where the first configuration information includes a repetition factor of the SRS resource, and the repetition factor of the SRS resource is a quantity N of positions at which the SRS resource is mapped to a same subcarrier and mapped to at least one continuous symbol in one time unit, where N≥1 and is an integer.

The processing unit 520 is configured to determine, based on the first configuration information, at least one first frequency domain resource to which the SRS resource is mapped in a first time unit.

The sending unit 530 is configured to send an SRS to the network device on the at least one first frequency domain resource.

The units in the terminal device 500 and other operations or functions in this embodiment of this application are for a purpose of implementing a corresponding procedure performed by the terminal device in the method for sending a reference signal, and details are not described herein again.

Figure 18:
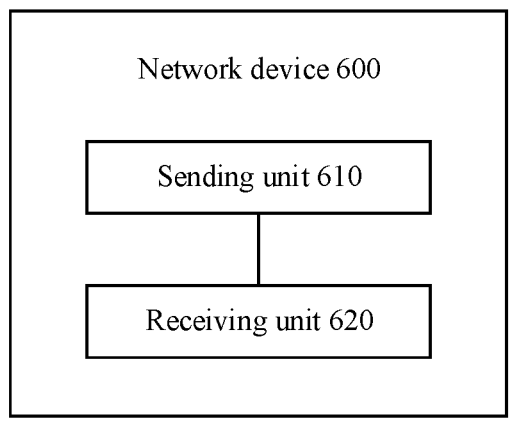
FIG. 18 is a schematic block diagram of a network device 600 according to an embodiment of this application.

FIG. 18 is a schematic block diagram of a network device 600 according to an embodiment of this application. As shown in FIG. 18, the network device 600 includes a sending unit 610 and a receiving unit 620.

The sending unit 610 is configured to send first configuration information of an SRS resource to a terminal device, where the first configuration information includes a repetition factor of the SRS resource, and the repetition factor of the SRS resource is a quantity N of positions at which the SRS resource is mapped to a same subcarrier and mapped to at least one continuous symbol in one time unit, where N≥1 and is an integer.

The receiving unit 620 is configured to receive an SRS that is sent by the terminal device on at least one first frequency domain resource, where the at least one first frequency domain resource is a frequency domain position that is determined by the terminal device based on the first configuration information and that is used for sending the SRS.

The units in the network device 600 and other operations or functions in this embodiment of this application are for a purpose of implementing a corresponding procedure performed by the network device in the method for sending a reference signal. For brevity, details are not described herein again.

Figure 19:
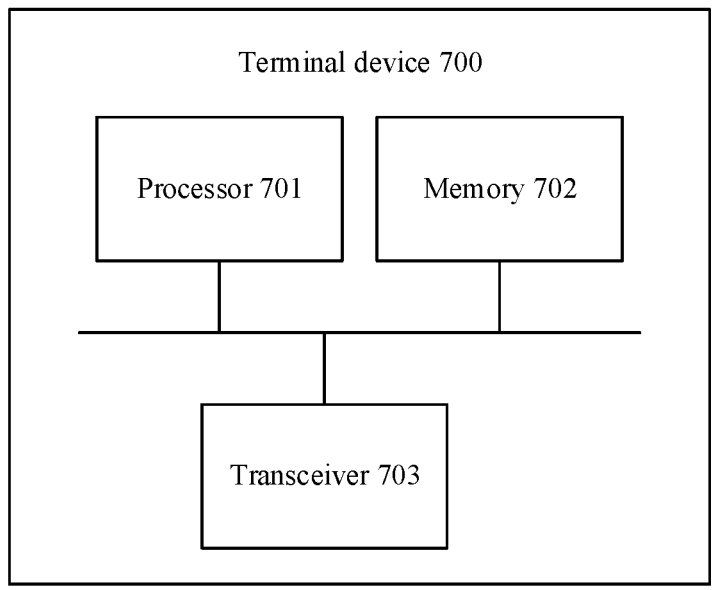
FIG. 19 is a schematic structural diagram of a terminal device 700 according to an embodiment of this application.

FIG. 19 is a schematic structural diagram of a terminal device 700 according to an embodiment of this application. As shown in FIG. 19, the terminal device 700 includes: one or more processors 701, one or more memories 702, and one or more transceivers 703. The processor 701 is configured to control the transceiver 703 to receive and send a signal. The memory 702 is configured to store a computer program. The processor 701 is configured to invoke the computer program from the memory 702 and run the computer program, so that the terminal device 700 performs the method for sending a reference signal. For brevity, details are not described herein again.

Figure 20:
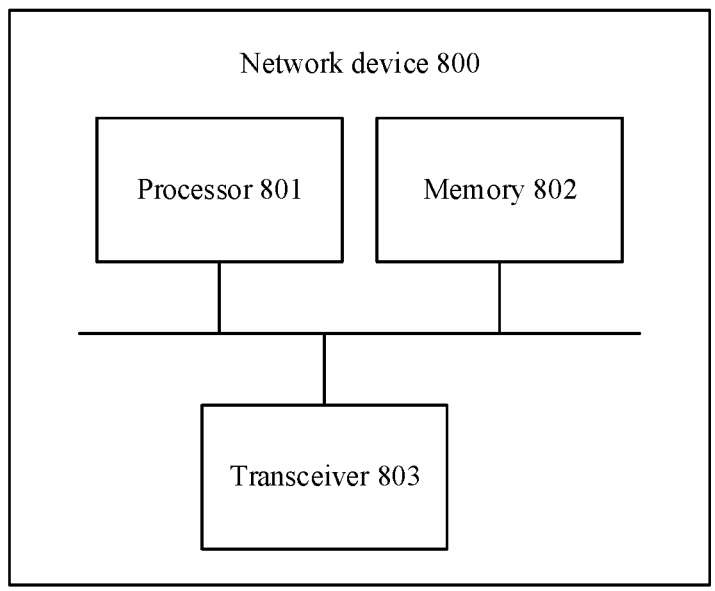
FIG. 20 is a schematic structural diagram of a network device 800 according to an embodiment of this application.

FIG. 20 is a schematic structural diagram of a network device 800 according to an embodiment of this application. As shown in FIG. 20, the network device 800 includes: one or more processors 801, one or more memories 802, and one or more transceivers 803. The processor 801 is configured to control the transceiver 803 to receive and send a signal. The memory 802 is configured to store a computer program. The processor 801 is configured to invoke the computer program from the memory 802 and run the computer program, so that the network device 800 performs the method for sending a reference signal. For brevity, details are not described herein again.

In addition, this application further provides a computer program product. The computer program product includes computer program code. When the computer program code is run on a computer, the computer is enabled to perform the corresponding procedure and/or operation performed by the terminal device in the foregoing method for sending a reference signal.

In addition, this application further provides a computer-readable medium. The computer-readable medium stores program code. When the computer program code is run on a computer, the computer is enabled to perform the corresponding procedure and/or operation performed by the terminal device in the foregoing method for sending a reference signal.

In addition, this application further provides a chip system. The chip system includes a processor, configured for a terminal device to implement a function in the foregoing method for sending a reference signal, for example, receiving or processing data and/or information in the foregoing method. In a possible design, the chip system further includes a memory. The memory is configured to store a program instruction and data necessary to the terminal device. The chip system may include a chip, or may include a chip and another discrete component.

In addition, this application further provides a chip system. The chip system includes a processor, configured to support a network device in implementing a function in the foregoing method for sending a reference signal, for example, sending or processing data and/or information in the foregoing method. In a possible design, the chip system further includes a memory. The memory is configured to store a program instruction and data necessary to the network device. The chip system may include a chip, or may include a chip and another discrete component.

In the foregoing embodiments, the processor may be a central processing unit (CPU), a microprocessor, an application-specific integrated circuit (ASIC), one or more integrated circuits configured to control program execution in the solutions of this application, or the like. For example, the processor may include a digital signal processor device, a microprocessor device, an analog-to-digital converter, a digital-to-analog converter, and the like. The processor may allocate, based on respective functions of these devices, functions of controlling a mobile device and processing a signal to these devices. In addition, the processor may include a function of operating one or more software programs, and the software program may be stored in the memory.

The function of the processor may be implemented by hardware, or may be implemented by hardware executing corresponding software. The hardware or software includes one or more modules corresponding to the foregoing function.

The memory may be a read-only memory (ROM) or a static storage device of another type that can store static information and an instruction; a random access memory (RAM) or a dynamic storage device of another type that can store information and an instruction; or an electrically erasable programmable read-only memory (EEPROM), a compact disc read-only memory (CD-ROM) or another compact-disc storage, an optical disc (including compressed disc, laser disk, optical disc, digital general optical disc, Blu-ray disc, or the like) storage, a magnetic disk storage medium or another magnetic storage device, or any other media that can be used to carry or store expected program code in a structural form of an instruction or data and can be accessed by a computer, but is not limited thereto.

Optionally, the memory and the processor may be physically independent units, or the memory may be integrated with the processor.

A person of ordinary skill in the art may be aware that, in combination with the examples described in the embodiments disclosed in this specification, units and algorithm steps can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiment, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual needs to achieve the objectives of the technical solutions of the embodiments.

In addition, functional units in the embodiments of this application may be integrated into one processing unit, or each of the units may exist alone physically, or two or more units are integrated into one unit.

With reference to the foregoing description, a person skilled in the art can be aware that the methods in embodiments of this specification can be implemented by hardware (for example, a logical circuit), software, or a combination of hardware and software. Whether the methods are performed by hardware or software depends on particular applications and design constraint conditions of the technical solutions. A person skilled in the art may use different methods to implement the described functions for each particular application, but it should not be considered that the implementation goes beyond the scope of this application.

When the foregoing functions are implemented in the form of software and sold or used as an independent product, the functions may be stored in a computer-readable storage medium. In this case, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for sending a sounding reference signal (SRS), comprising:
    receiving, by a terminal device, a first configuration information of an SRS resource of a first slot from a network device, wherein the first configuration information comprises a repetition factor $L_r$ of the SRS resource, and the first configuration information indicates the SRS resource consists of four OFDM symbols;
    determining, by the terminal device based on $n_{SRS}$, two frequency domain resources to which the SRS resource is mapped in the first slot; and
    determining different values of $n_{SRS}$ are associated with different frequency domain resources of the four OFDM symbols, wherein the $n_{SRS}$ is a count of frequency positions within the SRS resource that satisfies:

$$n_{SRS}=\lfloor l'/L_r \rfloor,$$

where l' represents a difference between a symbol number of the four OFDM symbols in the first slot and a starting symbol number of the SRS resource in the first slot, l'=0, 1, 2, or 3, and $L_r$=2; and
    sending, by the terminal device, an SRS to the network device on the determined two frequency domain resources.

2. The method according to claim 1, wherein the first configuration information further comprises the starting symbol number of the SRS resource in the first slot.

3. The method according to claim 1, wherein the SRS resource is configured as aperiodic.

4. A communication device, comprising:
    a transceiver, configured to receive first configuration information of a sounding reference signal (SRS) resource of a first slot from a network device, wherein the first configuration information comprises a repetition factor $L_r$ of the SRS resource, and the first configuration information indicates the SRS resource consists of four OFDM symbols; and
    a processor, configured to determine, based on $n_{SRS}$, two frequency domain resources to which the SRS resource is mapped in the first slot; and
    determining different values of $n_{SRS}$ are associated with different frequency domain resources of the four OFDM symbols, wherein the $n_{SRS}$ is a count of frequency positions within the SRS resource that satisfies:

$$n_{SRS}=\lfloor l'/L_r \rfloor,$$

where l' represents a difference between a symbol number of the four OFDM symbols in the first slot and a starting symbol number of the SRS resource in the first slot, l'=0, 1, 2, or 3, and $L_r$=2;
    wherein the transceiver is further configured to send, by the terminal device, an SRS to the network device on the determined two frequency domain resources.

5. The method according to claim 4, wherein the first configuration information further comprises the starting symbol number of the SRS resource in the first slot.

6. The method according to claim 4, wherein the SRS resource is configured as aperiodic.

7. A communication device, comprising:
a storage medium including executable instructions; and
a processor;
wherein the executable instructions, when executed by the processor, cause the communication device to:
receive first configuration information of a sounding reference signal (SRS) resource of a first slot from a network device, wherein the first configuration information comprises a repetition factor $L_r$ of the SRS resource, and the first configuration information indicates the SRS resource consists of four OFDM symbols;
determine, based on $n_{SRS}$, two frequency domain resources to which the SRS resource is mapped in the first slot; and
determine different values of $n_{SRS}$ are associated with different frequency domain resources of the four OFDM symbols, wherein the $n_{SRS}$ is a count of frequency positions within the SRS resource that satisfies:

$n_{SRS}=\lfloor l'/L_r \rfloor$, where l' represent a difference between a symbol number of the four OFDM symbols in the first slot and a starting symbol number of the SRS resource in the first slot, l'=0, 1, 2, or 3, and $L_r$=2; and
send an SRS to the network device on the determined two frequency domain resources.

8. The method according to claim 7, wherein the first configuration information further comprises the starting symbol number of the SRS resource in the first slot.

9. The method according to claim 7, wherein the SRS resource is configured as aperiodic.

10. A computer-readable storage medium, configured to store a computer program, wherein the computer program is used to execute an instruction of the method according to claim 1.

11. A communication system, comprising a user equipment and a base station, wherein the user equipment is configured to:
receive, by a terminal device, a first configuration information of a sounding reference signal (SRS) resource of a first slot from a network device, wherein the first configuration information comprises a repetition factor $L_r$ of the SRS resource, and the first configuration information indicates the SRS resource consists of four OFDM symbols;
determine, by the terminal device based on $n_{SRS}$, two frequency domain resources to which the SRS resource is mapped in the first slot; and
determine different values of $n_{SRS}$ are associated with different frequency domain resources of the four OFDM symbols, wherein the $n_{SRS}$ is a count of frequency positions within the SRS resource that satisfies:

$n_{SRS}=\lfloor l'/L_r \rfloor$, where l' represent a difference between a symbol number of the four OFDM symbols in the first slot and a starting symbol number of the SRS resource in the first slot, l'=0, 1, 2, or 3, and $L_r$=2; and
sending, by the terminal device, an SRS to the network device on the determined two frequency domain resources.

12. The system according to claim 11, wherein the first configuration information further comprises the starting symbol number of the SRS resource in the first slot.

13. The system according to claim 11, wherein the SRS resource is configured as aperiodic.

* * * * *

UNITED STATES PATENT AND TRADEMARK OFFICE
CERTIFICATE OF CORRECTION

PATENT NO. : 11,233,609 B2
APPLICATION NO. : 16/875755
DATED : January 25, 2022
INVENTOR(S) : Qin et al.

It is certified that error appears in the above-identified patent and that said Letters Patent is hereby corrected as shown below:

In the Claims

Claim 1: Column 36, Line 26: "where 1' represents a difference between a symbol number" should read -- where $l'$ represents a difference between a symbol number --.

Claim 1: Column 36, Line 29: "slot, 1'=0, 1, 2, or 3, and $L_r$ = 2; and" should read -- slot, $l'$=0, 1, 2, or 3, and $L_r$ = 2; and --.

Claim 4: Column 36, Line 56: "where 1' represents a difference between a symbol number" should read -- where $l'$ represents a difference between a symbol number --.

Claim 4: Column 36, Line 59: "slot, 1'=0, 1, 2, or 3, and $L_r$ = 2;" should read -- slot, $l'$=0, 1, 2, or 3, and $L_r$ = 2; --.

Claim 7: Column 37, Line 20: "where 1' represents a difference between a symbol number" should read -- where $l'$ represents a difference between a symbol number --.

Claim 7: Column 37, Line 23: "slot, 1'=0, 1, 2, or 3, and $L_r$ = 2; and" should read -- slot, $l'$=0, 1, 2, or 3, and $L_r$ = 2; and --.

Claim 11: Column 38, Line 21: "where 1' represents a difference between a symbol number" should read -- where $l'$ represents a difference between a symbol number --.

Claim 11: Column 38, Line 24: "slot, 1'=0, 1, 2, or 3, and $L_r$ = 2; and" should read -- slot, $l'$=0, 1, 2, or 3, and $L_r$ = 2; and --.

Signed and Sealed this
Fifth Day of July, 2022

Katherine Kelly Vidal
*Director of the United States Patent and Trademark Office*